United States Patent
Nishino

(10) Patent No.: US 11,218,042 B2
(45) Date of Patent: Jan. 4, 2022

(54) ROTOR FOR MOTOR

(71) Applicant: MINEBEA MITSUMI Inc., Nagano (JP)

(72) Inventor: Hirotake Nishino, Kitasaku-gun (JP)

(73) Assignee: MINEBEA MITSUMI Inc., Nagano (JP)

( * ) Notice: Subject to any disclaimer, the term of this patent is extended or adjusted under 35 U.S.C. 154(b) by 214 days.

(21) Appl. No.: 16/484,662

(22) PCT Filed: Jan. 19, 2018

(86) PCT No.: PCT/JP2018/001665
§ 371 (c)(1),
(2) Date: Aug. 8, 2019

(87) PCT Pub. No.: WO2018/147052
PCT Pub. Date: Aug. 16, 2018

(65) Prior Publication Data
US 2020/0059123 A1 Feb. 20, 2020

(30) Foreign Application Priority Data

Feb. 10, 2017 (JP) .............................. JP2017-023480

(51) Int. Cl.
*B23P 19/00* (2006.01)
*H02K 1/28* (2006.01)
(Continued)

(52) U.S. Cl.
CPC ................. *H02K 1/28* (2013.01); *H02K 5/04* (2013.01); *H02K 15/03* (2013.01); *H02K 15/12* (2013.01); *Y10T 29/53143* (2015.01)

(58) Field of Classification Search
CPC .......... H02K 15/03; H02K 15/12; H02K 1/28; Y10T 29/49826; Y10T 29/53143
(Continued)

(56) References Cited

U.S. PATENT DOCUMENTS 6,278,205 B1 * 8/2001 Reinhold ............... H02K 5/225
310/67 R
8,496,447 B2 * 7/2013 Ida ....................... H02K 5/1675
417/354
(Continued)

FOREIGN PATENT DOCUMENTS

CN 204290531 U 4/2015
JP 55-002313 A 1/1980
(Continued)

OTHER PUBLICATIONS

International Preliminary Report on Patentability for corresponding International Application No. PCT/JP2018/001665 dated Aug. 13, 2019.
(Continued)

*Primary Examiner* — Thiem D Phan
(74) *Attorney, Agent, or Firm* — Pearne & Gordon, LLP

(57) ABSTRACT

Provided is a motor rotor having a magnet attachment structure that can be used in a severe environment, for example. A motor rotor comprises: a rotary shaft; an annular magnetic body; a metal member; and an annular magnet that surrounds the magnetic body. The magnetic body has two surfaces that face each other in the rotary shaft direction, and a protruding part that protrudes from one surface of the two surfaces in the rotary shaft direction. The protruding part surrounds the rotary shaft. The magnet has two surfaces that face each other in the rotary shaft direction. The metal member is disposed on one surface of the magnet. The metal member surrounds the protruding part. The metal member is interposed between the protruding part and the one surface of the magnetic body.

12 Claims, 19 Drawing Sheets

(51) Int. Cl.
*H02K 5/04* (2006.01)
*H02K 15/03* (2006.01)
*H02K 15/12* (2006.01)

(58) Field of Classification Search
USPC ... 29/732, 564.1, 564.6, 596, 598, 609, 729, 29/787
See application file for complete search history.

(56) References Cited

U.S. PATENT DOCUMENTS

| | | |
|---|---|---|
| 2004/0061404 A1 | 4/2004 | Fujii et al. |
| 2006/0010682 A1 | 1/2006 | Fujii et al. |
| 2016/0065018 A1 | 3/2016 | Yoshida et al. |

FOREIGN PATENT DOCUMENTS

| | | |
|---|---|---|
| JP | 60-190153 A | 9/1985 |
| JP | 01-150469 U | 10/1989 |
| JP | 05-300679 A | 11/1993 |
| JP | H06-98489 A | 4/1994 |
| JP | 2004-166483 A | 6/2004 |
| JP | 2006-230093 A | 8/2006 |
| JP | 2009-278777 A | 11/2009 |
| JP | 2010-246238 A | 10/2010 |
| JP | 5259249 B | 8/2013 |
| JP | 2014-195356 A | 10/2014 |
| WO | 2016/208031 A1 | 12/2016 |
| WO | 2017/009902 A1 | 1/2017 |

OTHER PUBLICATIONS

English translation of Written Opinion for corresponding International Application No. PCT/JP2018/001665 dated Apr. 10, 2018.
International Search Report for corresponding International Application No. PCT/JP2018/001665 dated Apr. 10, 2018.
Written Opinion for corresponding International Application No. PCT/JP2018/001665 dated Apr. 10, 2018.
First Office Action dated Nov. 26, 2020 for corresponding Chinese Application No. 201880011454.5 and English translation.
Notice of Reasons for Refusal dated Dec. 22, 2020 for corresponding Japanese Application No. 2018-567344 and English translation.
Second Office Action dated Aug. 4, 2021 for corresponding Chinese Application No. 201880011454.5 and English translation.
Notice of Reasons for Refusal dated Oct. 27, 2021 for corresponding Japanese Application No. 2018-567344 and English translation.

* cited by examiner

ROTOR FOR MOTOR

TECHNICAL FIELD

The present invention relates to a rotor for a motor, and a manufacturing method of a motor and a rotor for a motor, and particularly, to a rotor for a motor having an annular magnet, and a manufacturing method of a motor and a rotor for a motor, each having an annular magnet.

BACKGROUND ART

A rotor for a motor having an annular magnet is used as a rotor for a motor. The annular magnet is attached, for example, to another member of the rotor for a motor by adhesion.

Patent Literature 1 described below discloses a structure that in a rotor in which a rotor magnet having a through hole is inserted in a molding die and after that, polymer materials are casted in the die to mold a rotor shaft portion having a rotor pinion portion, a rotation preventive portion is disposed on an outer peripheral surface of the rotor magnet.

DOCUMENT LIST

Patent Literature

Patent Literature 1: Japanese Patent Application Publication No. 55-002313

SUMMARY OF INVENTION

Technical Problem

Incidentally, a rotor having a structure that a magnet is attached by a method using only the adhesion has a problem of a heat resistance property and heat aging of an adhesive. That is, such a rotor possibly has, in a case where, for example, an environment in use of the motor is an environment to be subjected to a high temperature or a severe environment in which a cycle of high temperature and low temperature is repeated, the difficulty of maintaining reliability of the rotor.

The present invention is made in view of such a problem as an example, and provides a rotor for a motor having an attachment structure of a magnet usable in a severe environment, for example, and a manufacturing method for a motor provided with the rotor for a motor and the rotor for a motor.

Solution to Problem

For achieving the object, according to an aspect of the present invention, a rotor for a motor comprises a rotational shaft, an annular magnetic body having two surfaces opposing in a rotational shaft direction and a protruding portion protruding in the rotational shaft direction from one surface of the two surfaces, a metallic member surrounding the protruding portion, and an annular magnet surrounding the magnetic body, wherein the protruding portion surrounds the rotational shaft, the magnet is provided with two surfaces opposing in the rotational shaft direction, the metallic member is disposed at one surface of the magnet, and the metallic member is interposed between the protruding portion and one surface of the magnetic body.

Preferably the two surfaces of the magnetic body correspond respectively to an upper surface and a lower surface, the two surfaces of the magnet correspond respectively to an upper surface and a lower surface, and a position of the magnet with respect to the magnetic body is restricted in the rotational shaft direction by the metallic member.

Preferably a planar shape of the metallic member has an annular shape.

Preferably a planar shape of the protruding portion is formed in an annular shape, and the protruding portion includes a head portion and a tubular portion between the head portion and the one surface.

Preferably a planar shape of the head portion is formed in an annular shape.

Preferably the protruding portion has a recess recessed toward the rotational shaft between the head portion and an end surface, and a part of the metallic member is accommodated in the recess.

Preferably the magnet has a fitted portion, and at least one of the metallic member and the magnetic body has a fitting portion to be fitted in the fitted portion.

Preferably the fitting portion is a protruding portion radially protruding toward an inner peripheral surface of the magnet.

Preferably the fitted portion is a recessed portion radially recessed toward an outer peripheral surface from the inner peripheral surface of the magnet.

Preferably another surface of the magnetic body is provided with an annular flange portion radially extending toward the outside, and the flange portion supports another surface of the magnet.

Preferably a surface of the flange portion facing the other surface of the magnet is provided with the fitting portion, and the other surface of the magnet facing the flange portion is provided with the fitted portion.

According to another aspect of the present invention, a rotor for a motor comprises an annular magnetic body having two surfaces opposing in a rotational shaft direction, an annular metallic member surrounding a part of the magnetic body, and an annular magnet surrounding the magnetic body and the metallic member, wherein the annular metallic member is fixed mechanically to one surface of the magnetic body by the part of the magnetic body, the magnet is fixed mechanically to the magnetic body by the annular metallic member in the rotational shaft direction, and a lateral surface of the annular metallic member is fitted in a lateral surface of the magnet in a circumferential direction.

According to a further other aspect of the present invention, a motor comprises a housing, the rotor for a motor according to any of the aforementioned aspects, and a stator surrounding the rotor for a motor.

According to a furthermore other aspect of the present invention, in a manufacturing method of a rotor for a motor, the rotor for a motor comprises a rotational shaft, an annular magnetic body having two surfaces opposing in a rotational shaft direction and an protruding portion protruding in the rotational shaft direction from one surface of the two surfaces, a metallic member surrounding the protruding portion, and an annular magnet surrounding the magnetic body, the magnet being provided with two surfaces opposing in the rotational shaft direction, the manufacturing method of the rotor for a motor comprising a first step for disposing the metallic member on one surface of the magnetic body and on one surface of the magnet, and a second step for interposing the metallic member between the protruding portion and the one surface of the magnetic body.

For achieving the object, according to an aspect of the present invention, a rotor for a motor comprises a rotational shaft, an annular magnetic body having two surfaces opposing in a rotational shaft direction and another-side protruding portion protruding in the rotational shaft direction from another surface of the two surfaces, a ring-shaped member surrounding the other-side protruding portion, and an annular magnet surrounding the magnetic body, wherein the other-side protruding portion surrounds the rotational shaft, the magnet is provided with two surfaces opposing in the rotational shaft direction, the ring-shaped member is disposed on another surface of the magnet, and the ring-shaped member is engaged with the other-side protruding portion.

Preferably the magnetic body is provided with a flange portion, and the flange portion is disposed between the ring-shaped member and the annular magnet in the rotational shaft direction and has two surfaces opposing in the rotational shaft direction, wherein a first engaging portion is disposed on another surface of the two surface of the flange portion and on one side of an inner peripheral surface of the ring-shaped member, and a first engaged portion to be engaged with the first engaging portion is disposed on another side of the inner peripheral surface of the ring-shaped member.

Preferably the magnetic body is provided with the flange portion, and the flange portion is disposed between the ring-shaped member and the annular magnet in the rotational shaft direction and has the two surfaces opposing in the rotational shaft direction, wherein a second engaging portion is disposed on one surface of the two surface of the flange portion and on one side of an inner peripheral surface of the annular magnet, and a second engaged portion to be engaged with the second engaging portion is disposed on another side of the inner peripheral surface of the annular magnet.

According to another aspect of the present invention, a motor comprises a housing, the rotor for a motor according to any of the aforementioned aspects, a stator surrounding the rotor for a motor, and a sensor disposed in a position facing the ring-shaped member in the rotational shaft direction, wherein the ring-shaped member is a magnet.

According to the aspects of the present invention, there can be provided the rotor for a motor, and the manufacturing method for the motor and the rotor for a motor, having the attachment structure of the magnet usable in a severe environment, for example.

DESCRIPTION OF EMBODIMENTS

Hereinafter, motors according to embodiments of the present invention will be described.

In the following description, a direction in parallel with a shaft of a motor is described as an axial direction (a rotational shaft direction) in some cases. The axial direction is described as an upper-lower direction in some cases (a direction where the shaft projects as viewed from a housing of the motor is an upper direction). Herein, "upper-lower", "upper", "lower" and the like are words adopted for descriptive purposes at the time of focusing on the motor only, and directions of devices on which the motor is mounted or postures of the motor to be used are not limited to these words at all.

First Embodiment

Figure 1:
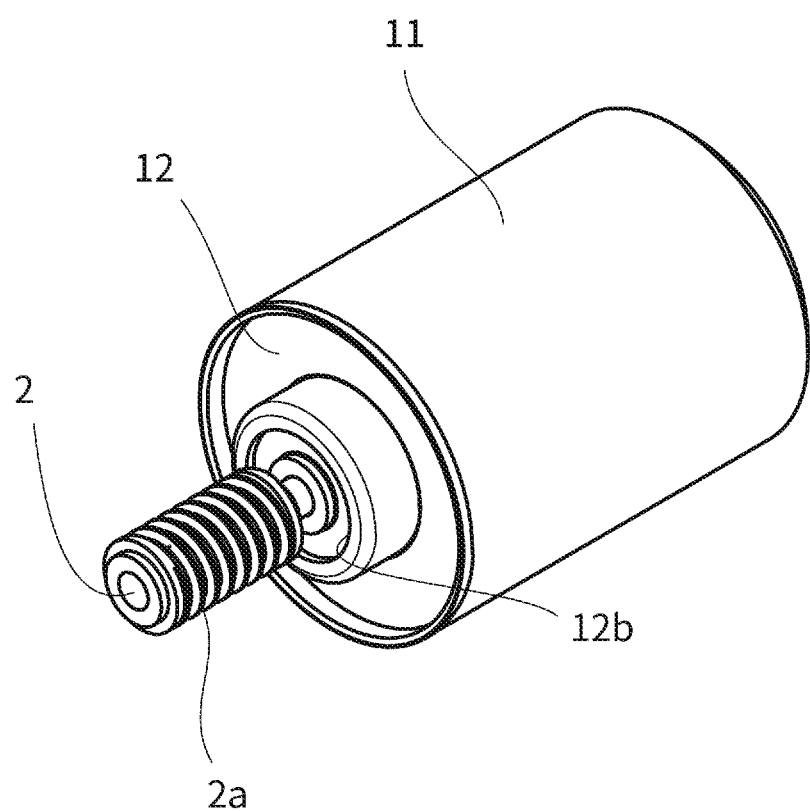
FIG. 1 A perspective view showing a motor in one of a first embodiment of the present invention.
Figure 2:
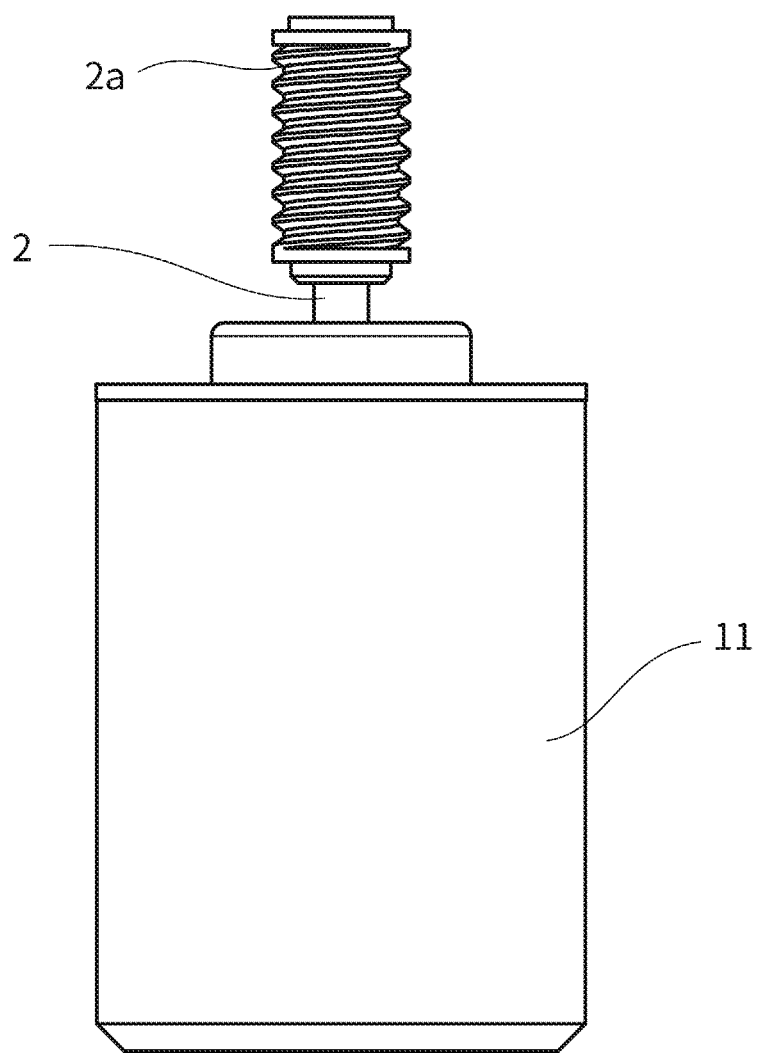
FIG. 2 A side view of the motor.

First, a motor according to a first embodiment of the present invention will be described. FIG. 1 is a perspective view showing a motor 1 in one of the first embodiment of the present invention. FIG. 2 is a side view of the motor 1.

As shown in FIG. 1, with the axial direction as the height direction of the motor 1, the motor 1 has a part an outer shape of which is a columnar shape, and a shaft (an example of a rotational shaft) 2 protruding from the columnar part. The shaft 2 is provided with two end portions in an axial direction. A part of the shaft 2 protrudes upward from a bracket 12 on an upper surface of the columnar part of the motor 1. The bracket 12 is provided with an opening 12b, and the shaft 2 passes through the opening 12b. A driving force of the motor 1 can be taken out of a part of the shaft 2 protruding upward from the opening 12b.

In the first embodiment of the present invention, a worm 2a is disposed in the vicinity of an upper end portion of the shaft 2 protruding upward from the opening 12b. The worm 2a defines a worm gear together with a gear and the like. The motor 1 can be used in an actuator for rotating a gear (not shown) engaging with the worm 2a with rotation of the shaft 2. The motor 1 can be used in an application of an electric actuator to be used in automobiles or motorcycles, for example.

The motor 1 as shown in FIG. 1 is a so-called inner rotor type brushless motor. The motor 1 is provided roughly with a cylindrical housing 11 an upper end portion of which is an opening and a lower end portion of which is a bottom portion, respective members of a magnet 3 to be described later and the like inside of the housing 11 and the plate-shaped bracket 12 sealing the opening of the housing 11.

The bracket 12 of the motor 1 may be provided with, for example, a terminal and the like for supply of electric power for driving the motor 1 and an opening and the like different from the opening 12b. In FIG. 1, illustration of them is omitted.

Figure 3:
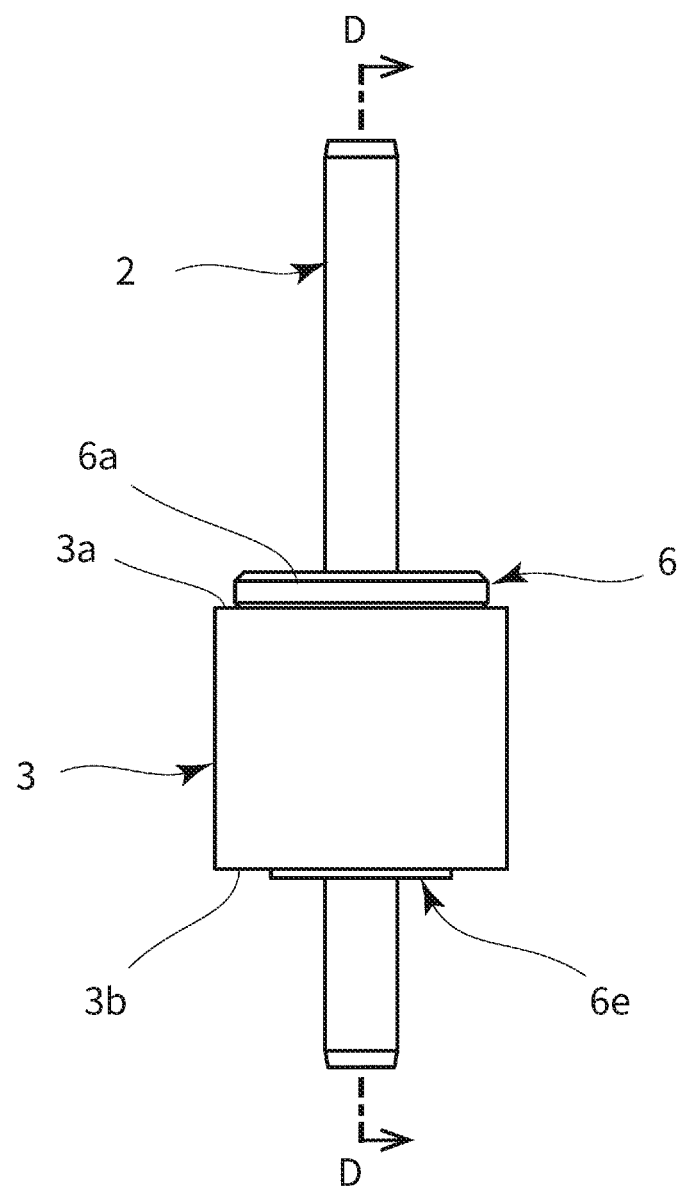
FIG. 3 A side view showing a rotor of the motor.
Figure 4:
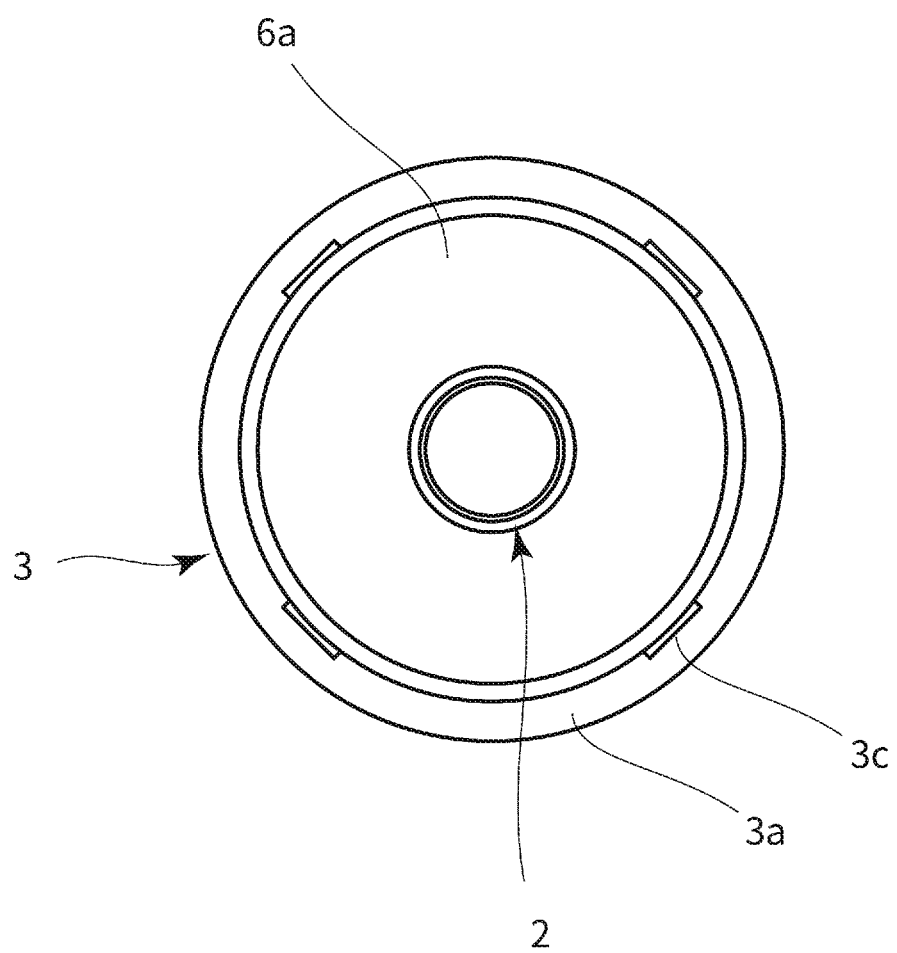
FIG. 4 A plan view of the rotor.
Figure 5:
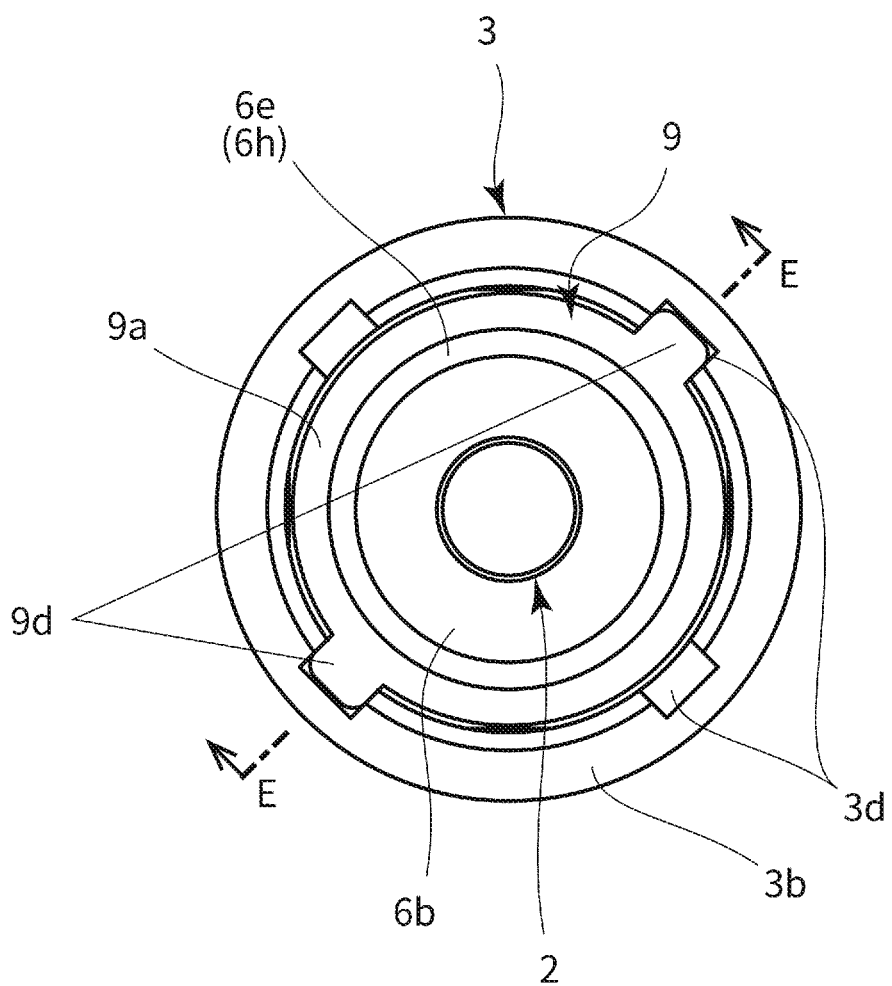
FIG. 5 A bottom view of the rotor.
Figure 6:
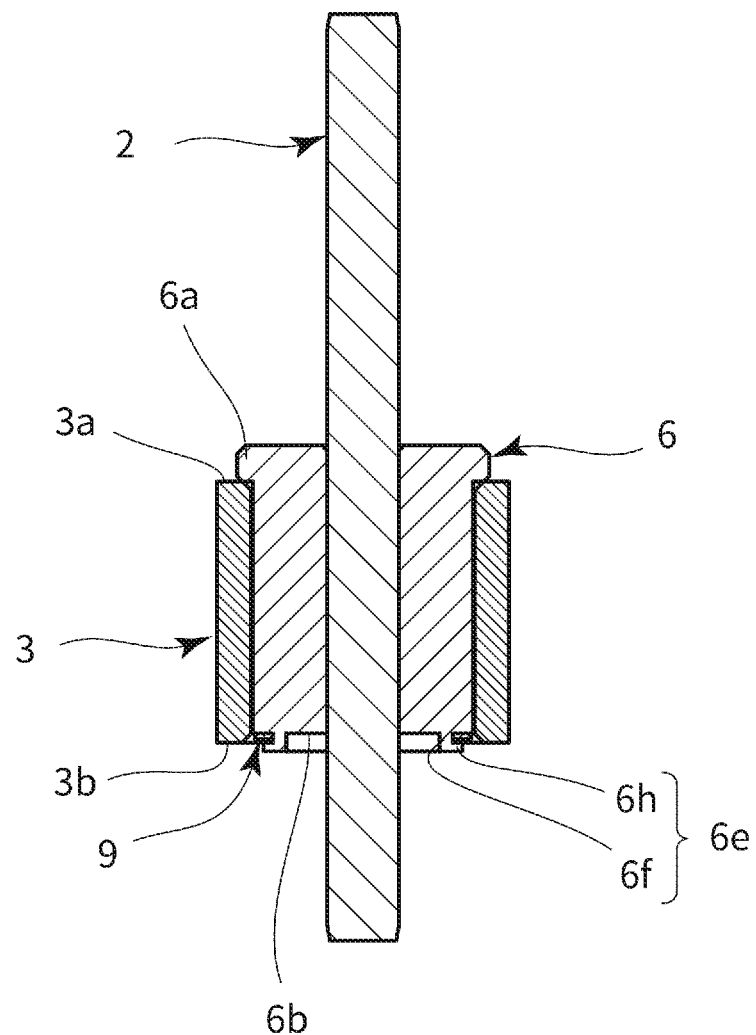
FIG. 6 A cross part taken along line D-D in FIG. 3.
Figure 7:
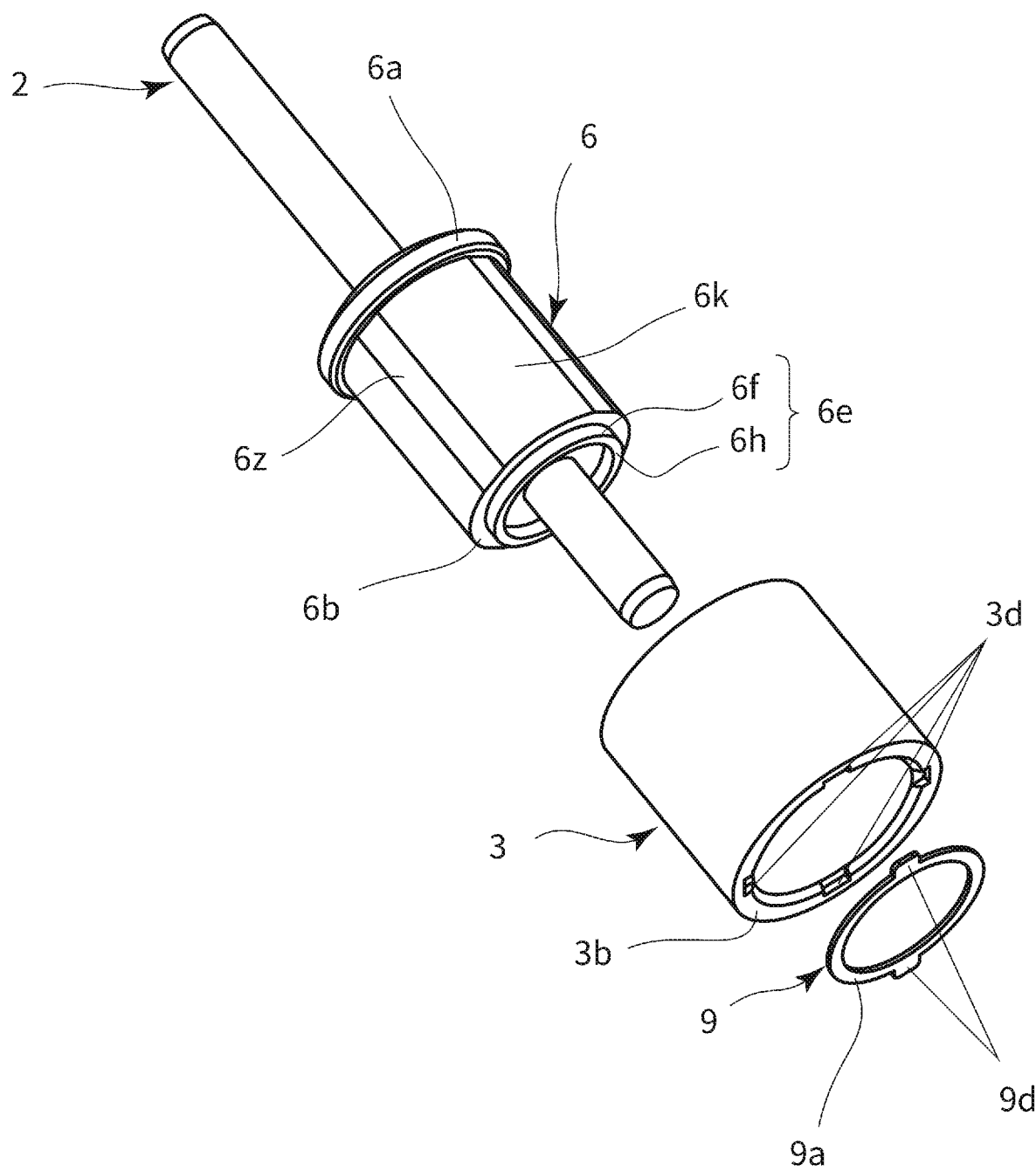
FIG. 7 An exploded perspective view of the rotor.
Figure 8:
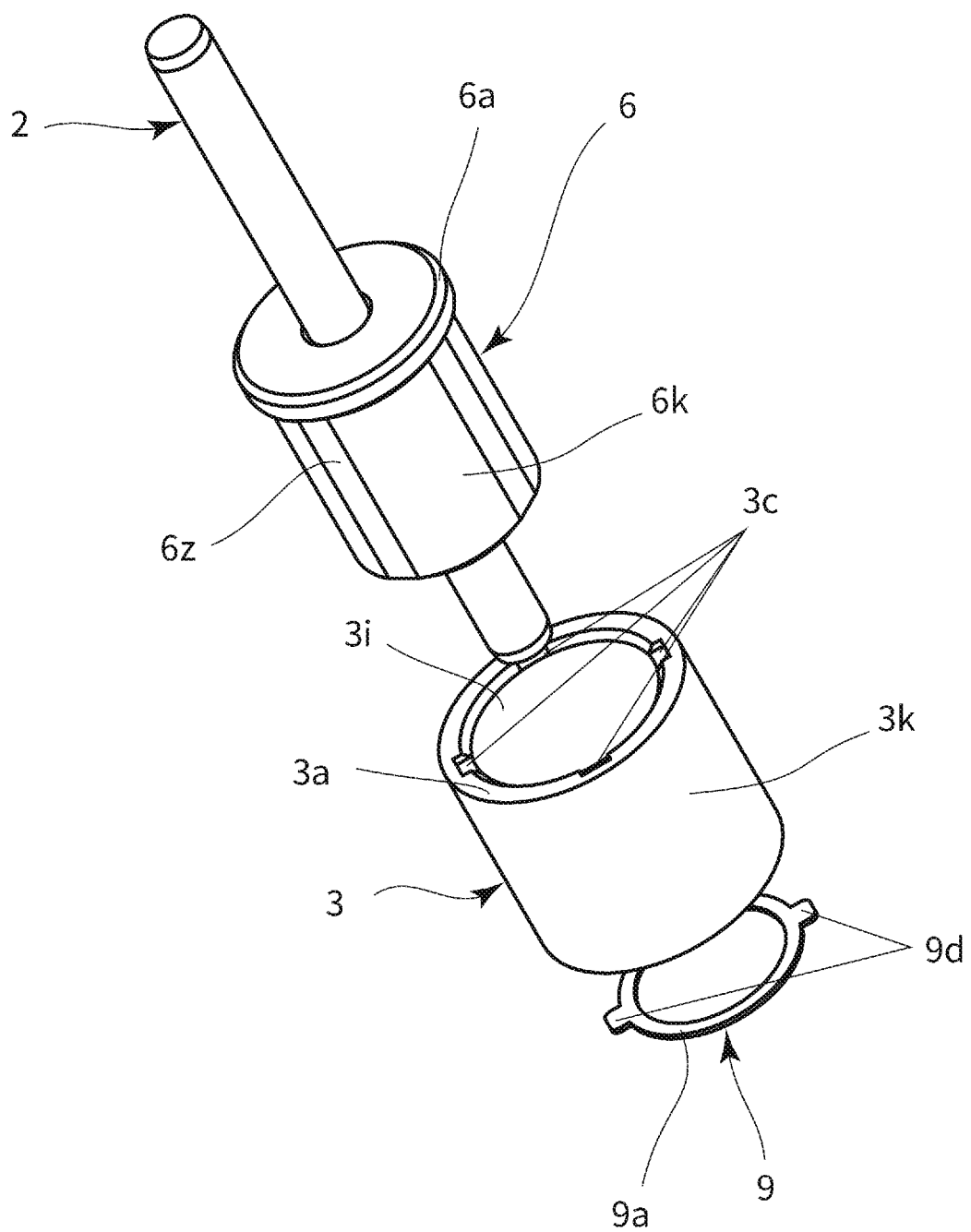
FIG. 8 An exploded perspective view of the rotor as viewed from a direction different from that in FIG. 7.
Figure 9:
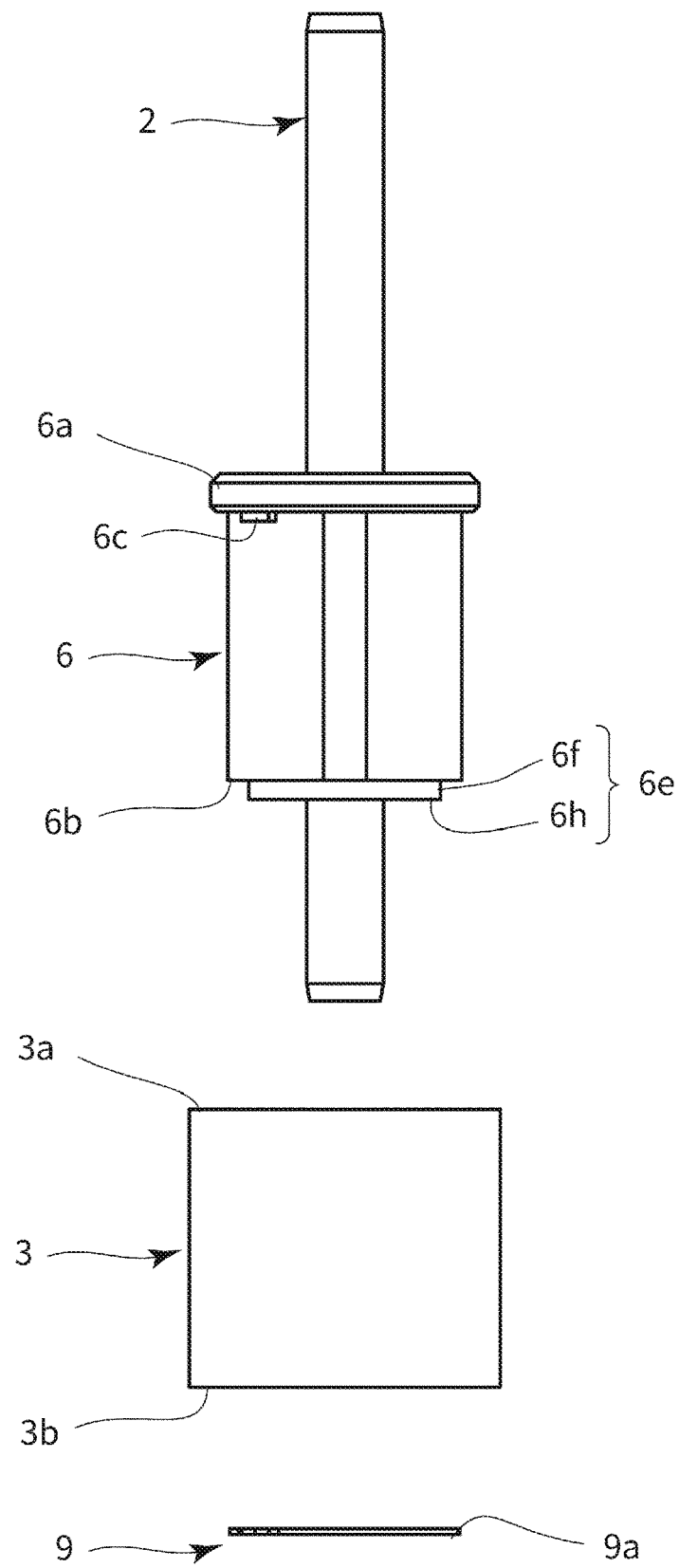
FIG. 9 An exploded side view of the rotor.
Figure 10:
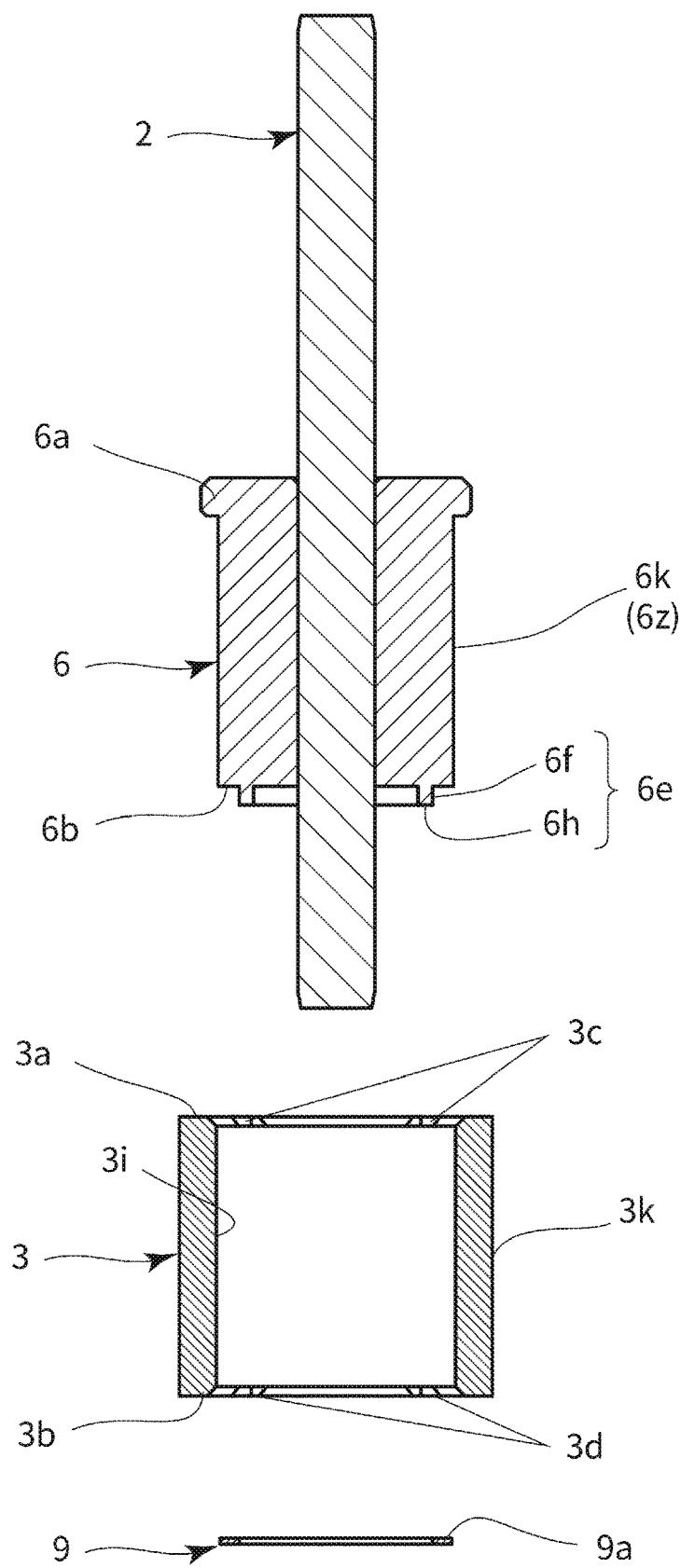
FIG. 10 An exploded side cross part of the rotor.
Figure 11:
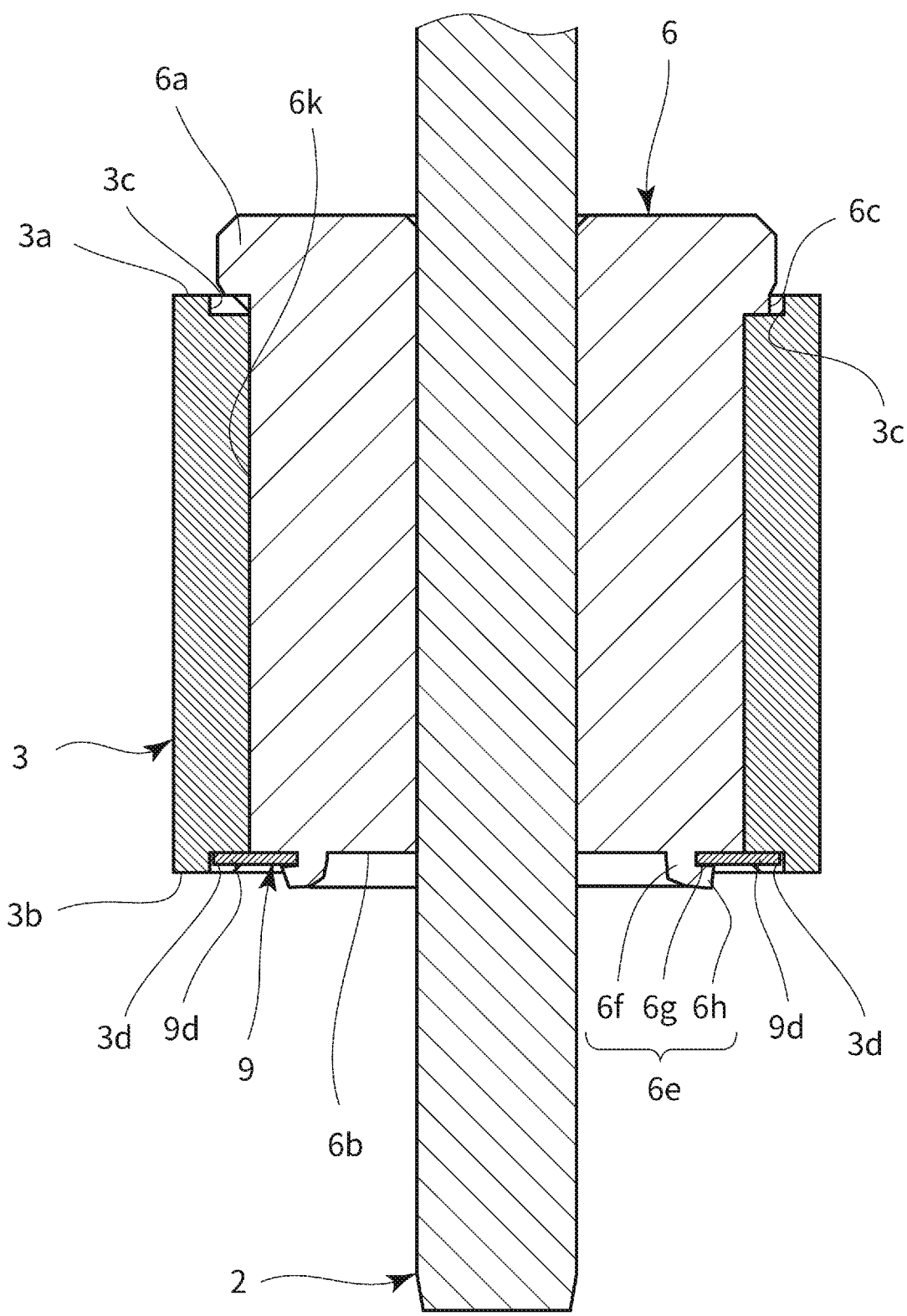
FIG. 11 An enlarged cross part taken along line E-E in FIG. 5.

FIG. 3 is a side view showing a rotor 1a as one of members defining the motor 1. FIG. 4 is a plan view of the rotor 1a. FIG. 5 is a bottom view of the rotor 1a. FIG. 6 is a cross part taken along line D-D in FIG. 3. FIG. 7 is an exploded perspective view of the rotor 1a. FIG. 8 is an exploded perspective view of the rotor 1a as viewed from a direction different from that in FIG. 7. FIG. 9 is an exploded side view of the rotor 1a. FIG. 10 is an exploded side cross part of the rotor 1a. FIG. 11 is an enlarged cross part taken along line E-E in FIG. 5.

As shown in FIG. 3 to FIG. 6, the rotor (rotor for a motor) 1a is provided with the shaft 2, the magnet 3, a core (an example of a magnetic body) 6, and a ring (an example of a metallic member) 9. The magnet 3, the core 6 and the ring 9 out of the rotor 1a are accommodated inside of the housing 11. A bearing rotatably supporting the rotor 1a and a stator which are omitted in illustration are arranged inside of the housing 11. The stator is constituted with a coil, an insulator, a stator core and the like.

The magnet 3 is a bond magnet molded by mixing a magnetic material with a resin material, for example. The magnet 3 has a cylindrical shape. The magnet 3 is located to surround the core 6. That is, a planar shape of the magnet 3 is annularly formed to surround the shaft 2. The magnet 3 has two surfaces (an upper surface 3a, a lower surface 3b) opposing (positioned back-to-back to each other, directed back-to-back) in the rotational shaft direction. An inclined surface as a chamfer portion is disposed between an inner peripheral surface 3i and each of the upper surface 3a and the lower surface 3b of the magnet 3.

As shown in FIG. 8 and the like, fitted portions 3c are disposed on an upper surface 3a of the magnet 3, particularly in an inner peripheral end portion in an upper side. The fitted portion 3c is a recessed portion recessed toward an outer peripheral surface 3k from the inner peripheral surface 3i of the magnet 3 in a radial direction. The fitted portion 3c is the recessed portion recessed downward from the upper surface 3a of the magnet 3 in the upper side in an axial direction. The fitted portions 3c are arranged in four locations. The four fitted portions 3c are arranged to be spaced by an interval having a predetermined angle from each other around the rotational shaft, by an interval of 90 degrees in a shown example.

As shown in FIG. 7 and the like, fitted portions 3d are disposed on a lower end portion of the magnet 3. The fitted portion 3d is a recessed portion recessed toward the outer peripheral surface 3k from the inner peripheral surface 3i of the magnet 3 in the radial direction. The fitted portion 3c is the recessed portion recessed upward from the lower surface 3b of the magnet 3 in the axial direction. The fitted portions 3d are arranged in four locations. The four fitted portions 3d are arranged to be spaced by an interval having a predetermined angle from each other, by an interval of 90 degrees around the rotational shaft in a shown example.

In the first embodiment of the present invention, each of the four fitted portions 3c is located in a position of overlapping with each of the four fitted portions 3d in a planar view. That is, a position of each of the fitted portions 3c in a circumferential direction is the same as a position of each of the fitted portions 3d in the circumferential direction. That is, the magnet 3 has a shape symmetric about a plane which is in a position where a distance from an upper surface is equal to a distance from a lower surface and is vertical to the rotational shaft, and is configured to be attachable to the rotor 1a regardless of an orientation of the upper-lower direction. The numbers and positions of the fitted portions 3c, 3d are not limited to the aforementioned ones.

The core 6 is formed of a magnetic body such as iron. The core 6 roughly has a columnar shape where an axial direction is a height direction. The core 6 has two surfaces (an upper surface 6a and a lower surface 6b) opposing in the rotational shaft direction. A planar shape of the core 6 is annularly formed to surround the shaft 2. That is, the shaft 2 penetrates the core 6 upward and downward. The shaft 2 is fixed to the core 6 in a state of being press-fitted in the core 6.

The core 6 has a protruding portion 6e. The protruding portion 6e is disposed in a downward surface (a lower surface) 6b-side of the core 6. The protruding portion 6e protrudes in the rotational shaft direction from the lower surface 6b of the core 6. That is, the protruding portion 6e protrudes downward from the lower surface 6b of the core 6. The protruding portion 6e surrounds the shaft 2.

The core 6 has a flange portion 6a formed in a flange shape. The flange portion 6a is an upward surface (an upper surface 6a) of the core 6. That is, in the rotational shaft direction, a surface (another surface) at the opposite side of the downward surface (the lower surface 6b, one surface) of the core 6 is provided with the flange portion 6a. The flange portion 6a extends over an entire periphery of the core 6 in the circumferential direction, and is a part of the core 6 extends toward the outside over the other portions of the core 6 in the radial direction. That is, the flange portion 6a is annularly formed to surround the outer peripheral surface of the shaft 2. The outside in the radial direction is a direction away from the shaft 2 in a shown example.

The magnet 3 is located to surround the outer peripheral surface 6k of the core 6. An inner diameter (a diameter of the inner peripheral surface 3i) of the magnet 3 is slightly larger than an outer diameter (a diameter of the outer peripheral surface 6k) of the core 6. An adhesive is disposed between the inner peripheral surface 3i of the magnet 3 and the outer peripheral surface 6k of the core 6, and the magnet 3 adheres to the core 6.

As shown in FIG. 7 and the like, curved portions curved and planar portions 6z as a planar shape are provided in the outer peripheral surface 6k of the core 6. The planar portion 6z is formed between both end portions of the curved portions in the circumferential direction. The planar portion 6z extends linearly along the rotational shaft direction. In the first embodiment of the present invention, the four planar portions 6z are located to be spaced with intervals each having 90 degrees around the rotational shaft. A space is formed between the planar portion 6z and the inner peripheral surface 3i of the magnet 3 in the radial direction, and this space is slightly wider than a space between the outer peripheral surface 6k of the core 6 and the inner peripheral surface 3i of the magnet 3. Thereby on assembly of the rotor 1a, extra adhesives out of the adhesives applied between the magnet 3 and the core 6 remain between the planar portion 6z and the inner peripheral surface 3i. Therefore a sufficient amount of adhesives are applied to cause the magnet 3 to adhere securely to the core 6, while being capable of preventing the extra adhesives from overflowing to the outside.

As shown in FIG. 6, a surface facing the upper surface 3a of the magnet 3 is formed on the lower side of the flange portion 6a in the rotational shaft direction. The upper surface 3a of the magnet 3 faces a surface of the downside of the flange portion 6a. The magnet 3 is located such that the upper surface 3a contacts the flange portion 6a. The flange portion 6a supports the upper surface 3a of the magnet 3. The flange portion 6a restricts a position of the surface of the upside of the magnet 3 in the rotational shaft direction. In the shown example, the flange portion 6a restricts a position of the upper surface 3a of the magnet 3. In detail, since the flange portion 6a contacts the upper surface 3a of the magnet 3, the upper surface 3a of the magnet 3 can be prevented from displacing upward over the flange portion 6a. That is, since the magnet 3 is supported by the core 6 in the rotational shaft direction, the magnet 3 can be prevented from displacing upward over the core 6.

As shown in FIG. 9, in the first embodiment of the present invention, the core 6 has a fitting portion 6c. The fitting portion 6c is a protruding portion protruding toward the inner peripheral surface 3i of the magnet 3 from the outer peripheral surface 6k of the core 6 in the radial direction. In a shown example, the fitting portion 6c is disposed on a surface of the flange portion 6a facing the magnet 3 in the rotational shaft direction. As shown in FIG. 11, in the rotational shaft direction, the fitting portion 6c protrudes downward from a surface of the flange portion 6a facing the magnet 3. The fitting portion 6c is formed to be fitted in the fitted portion 3c in an end portion of the upside of the magnet 3. The fitting portion 6c may be disposed on the outer peripheral surface 6k of the core 6.

In this way, with the fitting portion 6c being fitted in the fitted portion 3c, the position of the magnet 3 with respect to the core 6 is restricted in the circumferential direction. That is, the magnet 3 is supported by the core 6 not to rotate in the circumferential direction to the core 6.

The ring 9 is the metallic member formed by a metallic material such as iron or aluminum. The ring 9 is formed in a flat plate shape. A planar shape of the ring 9 is an annular shape. The ring 9 can be manufactured by punching out a steel plate in a predetermined shape, for example. The ring 9 can be manufactured at a relatively low cost.

The ring 9 has an annular portion 9a formed in a band shape and in an annular shape, and two fitting portions 9d. Each of the fitting portions 9d is a part protruding toward a radial outside (in a direction away from the rotational shaft) from a part of the annular portion 9a. That is, the fitting portion 9d is a protruding portion protruding toward the inner peripheral surface 3i of the magnet 3 in the radial direction. The two fitting portions 9d are located in positions where one thereof is symmetrical about a point of the other to the center of the ring 9. That is, the two fitting portions 9d are located to be spaced around the rotational shaft by an interval of 180 degrees.

The annular portion 9a of the ring 9 is formed to surround the protruding portion 6e of the core 6. An inner diameter of the annular portion 9a of the ring 9 is slightly larger than an outer diameter of a part of the protruding portion 6e, the ring 9 being located in the part.

As shown in FIG. 5, in the first embodiment of the present invention, an outer diameter of the annular portion 9a is slightly smaller than a diameter of the outer peripheral surface 6k of the core 6. Each of the fitting portions 9d extends toward the magnet 3 from the core 6 in the radial direction. A tip end (an outward end portion) of each of the fitting portions 9d is positioned in the outside over the outer peripheral surface 6k of the core 6 (on the outer peripheral surface side of the magnet 3) as the rotor 1a is viewed from the bottom surface side. The respective fitting portions 9d are formed to be fitted in the fitted portions 3d in the downside of the magnet 3. That is, each of the fitting portions 9d has a width narrower than a width of the recessed portion of the fitted portion 3d in the circumferential direction, and is formed such that a distance from the rotational shaft to the tip end of the fitting portion 9d is shorter than a distance between the rotational shaft and the most recessed portion of the fitted portion 3d in the rotational shaft direction.

As shown in FIG. 11, the ring 9 is located on one surface of the core 6. The ring 9 is located on the lower surface 6b of the core 6. The ring 9 surrounds the protruding portion 6e. The ring 9 is fixed to the core 6. The ring 9 is located on one surface of the magnet 3. The two fitting portions 9d provided in the ring 9 are fitted in any two of the four fitted portions 3d. In this way, with the fitting portion 9d being fitted in the fitted portion 3d, a position of the vicinity of the lower surface 3b of the magnet 3 is in a state of being restricted by the fitting portion 9d. That is, the position of the magnet 3 with respect to the core 6 is restricted by the ring 9 in the axial direction. The magnet 3 is fixed to the core 6 by the ring 9 in the rotational shaft direction.

The ring 9 is fixed to the core 6. The fitting portion 9d is fitted in the fitted portion 3d. With this configuration, the position of the magnet 3 with respect to the core 6 is restricted by the ring 9 in the circumferential direction. That is, the magnet 3 is fixed to the core 6 by the ring 9 in the circumferential direction.

Herein, in the first embodiment of the present invention, the ring 9 is fixed to the core 6 in a state where the annular portion 9a is engaged with the protruding portion 6e of the core 6. As shown in FIG. 11, a planar shape of the protruding portion 6e is formed in an annular shape. The protruding portion 6e has a head portion 6h and a tubular portion 6f disposed between the head portion 6h and the lower surface 6b of the core 6. A planar shape of the head portion 6h is formed in an annular shape. The head portion 6h is in a position more separate from the rotational shaft than the tubular portion 6f. That is, the protruding portion 6e has the head portion 6h having a flange shape. In this way, with the head portion 6h in the protruding portion 6e being formed in the flange shape, a recess 6g is formed between the head portion 6h and the lower surface 6b in the protruding portion 6e to be recessed toward the shaft 2.

The ring 9 is interposed between the protruding portion 6e and the one surface of the core 6. The annular portion 9a of the ring 9 is disposed to surround the periphery of the tubular portion 6f, and a part of the annular portion 9a is accommodated in the recess 6g of the protruding portion 6e. That is, as shown in FIG. 11, the annular portion 9a of the ring 9 is disposed to be interposed between the head portion 6h and the lower surface 6b of the core 6. The ring 9 is fixed mechanically to the core 6 with a part of the inward side of the annular portion 9a being interposed between the head portion 6h and the lower surface 6b.

Figure 12:
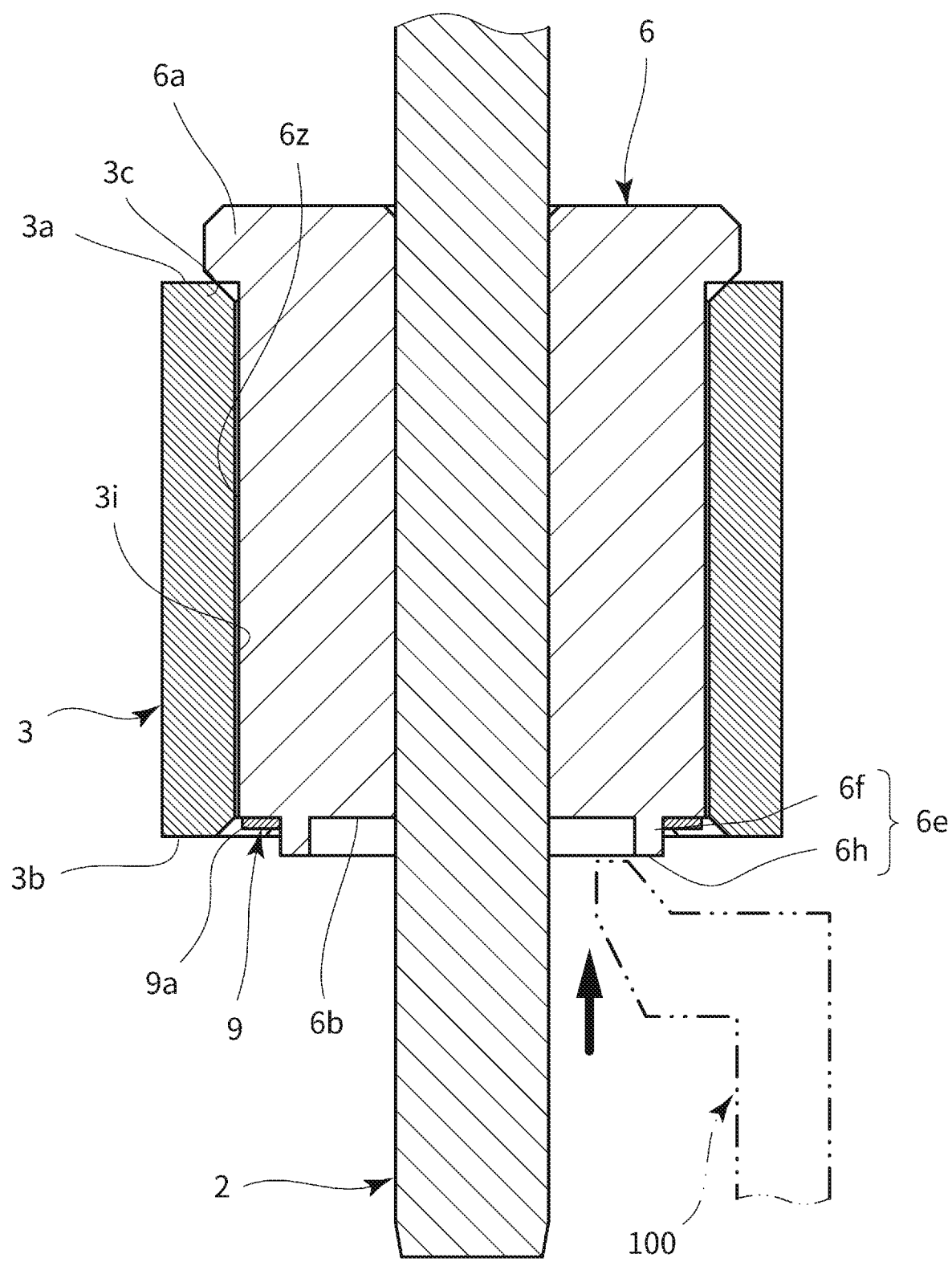
FIG. 12 A cross part explaining a fixing structure of a ring.

FIG. 12 is a cross part explaining a fixing structure of the ring 9.

At the manufacturing of the rotor 1a, a first step for disposing the ring 9 on the one surface of the core 6 and on the one surface of the magnet 3 and a second step for interposing the ring 9 between the protruding portion 6e and the one surface of the core 6 are executed. Specifically, for example, in a state where the ring 9 is located on the lower surface 6b of the core 6, the protruding portion 6e is plastic-deformed such that the part of the inward side of the annular portion 9a is interposed between the head portion 6h and the lower surface 6b. Thereby the ring 9 is fixed mechanically to the core 6. That is, the ring 9 is fixed to the core 6 by caulking of the protruding portion 6e.

As shown in FIG. 12, in the first embodiment of the present invention, the protruding portion 6e has the tubular portion 6f having the cylindrical shape protruding downward from the lower surface 6b before executing a caulking step. In a state where the tubular portion 6f is in the cylindrical shape, the ring 9 can be located on the lower surface 6b to surround the periphery of the tubular portion 6f from the downward side. In a state where the ring 9 is located on the lower surface 6b, a jig 100 is caused to abut on the head portion 6h such that a force directed to a radial outside (a direction away from the shaft 2 in the radial direction) is applied to the head portion 6h of the protruding portion 6e. By displacing the head portion 6h to the radial outside such that the protruding portion 6e is deformed by the jig 100 to be in a flange shape, the ring 9 can be fixed to the core 6 as shown in FIG. 11.

The jig 100 is caused to abut on the head portion 6h, while rotating the rotor 1a around the rotational shaft or rotating the jig 100 around the rotational shaft, and thereby it is possible to perform spin caulking. A caulking method is not limited to the spin caulking. For example, the head portion 6h is caused to be pushed out in the entire periphery by causing a jig having an upper end portion in a tapered shape to abut on an inner side of the head portion 6h and to press the head portion 6h upward. In this way, the caulking may be performed.

As explained above, in the first embodiment of the present invention, the magnet 3 is fixed to the core 6 in a state where a position of the magnet 3 in the rotational shaft direction is restricted by the flange portion 6a and the ring 9. The ring 9 is fixed mechanically to the core 6. Such a mechanical fixing structure can endure many kinds of vibrations in various directions without being largely affected by contraction/expansion of the members. Accordingly reliability of the rotor 1a can be maintained longer than a structure of fixing the magnet 3 to the core 6 by a method using adhesion only.

In a case of fixing the magnet 3 by the method using the adhesion only, it is necessary to accurately manage an application amount or application positions of adhesives at the production, therefore deteriorating the productivity. However, in the first embodiment of the present invention, since both of the method by the adhesion and the method of the fixing the ring 9 by the caulking can be used, it is possible to reduce dependency on the method by the adhesion. Accordingly the manufacturing man-hour can be eliminated to suppress manufacturing costs.

The ring 9 is fixed to the core 6 by the caulking of the protruding portion 6e. Therefore it is possible to strongly fix the ring 9 to the core 6 by an easy method. Consequently the rotor 1a with high reliability can be manufactured at a relatively low cost.

The fitting portion 9d of the ring 9 protrudes radially toward the fitted portion 3d of the magnet 3 to be fitted in the fitted portion 3d. The fitting portion 6c of the core 6 protrudes radially toward the fitted portion 3c of the magnet 3 to be fitted in the fitted portion 3c. Accordingly even if torque is applied to the magnet 3, a state where the fitting portions 9d, 9c are fitted in the fitted portions 3d, 3c is maintained, and the magnet 3 stays in a state of being held not to rotate to the core 6. Thereby the reliability of the rotor 1a can be maintained longer.

In this way, the rotor 1a, which is different from the method by the adhesion only, is assembled by the method using a mechanical fixing method.

Therefore, for example, even in a case where the motor 1 is used under an environment subjected to a high temperature, an environment where a cycle of a high temperature and a low temperature is repeated or an environment where a large change in temperature frequently occurs, or even in a case where the motor 1 is used under an environment where various vibrations are applied to the motor 1, the reliability of the motor 1 can be improved more than conventional.

For example, in a case where the motor 1 is used in an engine room or in an actuator used in a position near an engine in a vehicle or the like using an engine, the motor 1 is exposed to a high temperature. In addition, when heat is generated at the time of driving the motor 1 in such a condition, a temperature of the motor 1 possibly increases close to 200 degrees C. In addition, in this vehicle, vibrations of the engine or vibrations to be generated at the running of the vehicle possibly are generated strongly. In such a case, in the rotor where the magnet is fixed by the adhesion only using a conventional, general adhesive, the adhesive itself fixing the magnet cracks due to heat aging or repetition of expansion/contraction of each member to largely reduce a holding force of the magnet. When a heat-resistant adhesive of achieving a performance even in a temperature region of a high temperature is used, a problem due to such heat aging is difficult to occur, but manufacturing costs rise suddenly. On the other hand, in a case of using the rotor 1a where the magnet 3 is attached by the mechanical method as the first embodiment of the present invention, the magnet 3 is fixed in the axial direction, and the magnet 3 is fixed in the circumferential direction by the fitting of the fitting portions 9d, 9c in the fitted portions 3d, 3c. Therefore occurrence of such a problem can be suppressed. In a case of fixing the magnet 3 to the core 6 using the adhesive in addition to the mechanical method, even if the performance of the adhesive is damaged, the magnet 3 is held to the core 6 by the mechanical method.

Others

Only any one of a fitting structure between the fitting portion of the ring and the fitted portion of the magnet and a fitting structure between the fitting portion of the core and the fitted portion of the magnet may be provided. Even in such a case, the magnet can be securely held not to rotate to the core.

Both of the fitting structure between the ring and the magnet and the fitting structure between the core and the magnet may be not provided. Even in such a case, by restricting an axial position of the magnet with respect to the core by the ring, the reliability of the rotor can be improved more than in a case of using the method by the adhesive only.

The protruding portion of the core is not limited to the tubular shape surrounding the rotational shaft. For example, a plurality of protruding portions may be annularly scattered on the surface of the core to surround the rotational shaft. In this case, the ring may be interposed between each of the protruding portions and the end surface of the core to be fixed.

In place of the ring having the closed planar shape, another metallic member having an open planar shape may be used. For example, the metallic member may be a member in a C-letter shape or the like lacking in a part of an annular portion. The metallic member is not limited to one member, but a plurality of members may be arranged to surround the periphery of the protruding portion and a position of the magnet may be restricted by the respective metallic members.

Second Embodiment

Figure 13:
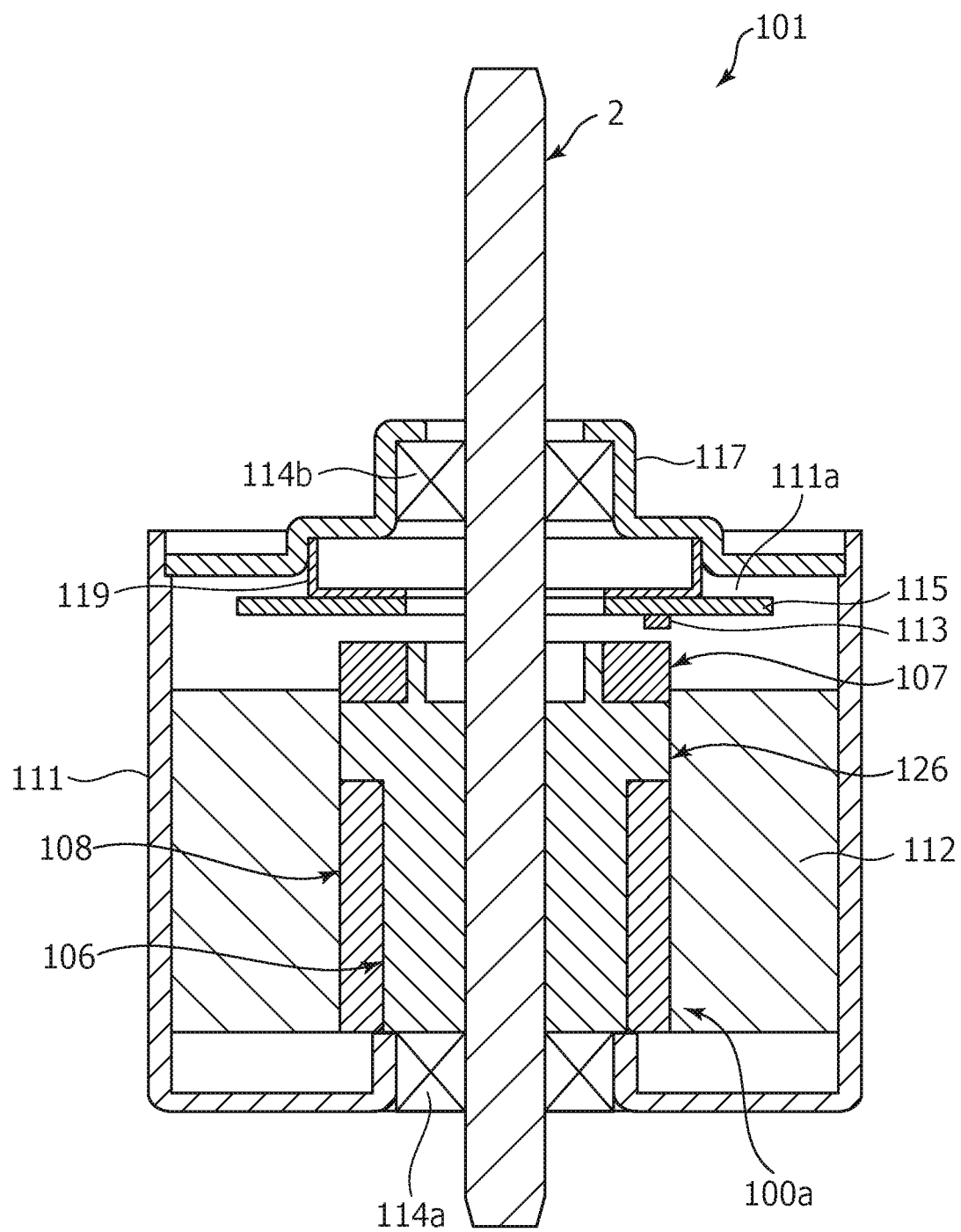
FIG. 13 A cross part showing a motor in one of a second embodiment of the present invention.

Next, a motor according to a second embodiment of the present invention will be described. FIG. 13 is a perspective view showing a motor 101 in the second embodiment of the present invention.

The motor 101 according to the second embodiment of the present invention is a motor in which an improvement is made on the structure of the magnet 3 and the structure of the core 6 in the motor 1 according to the first embodiment of the present invention as mentioned above, and a structure of the other components is similar to that of the first embodiment. Therefore in the following description, components in the same as or similar to those in the aforementioned motor 1 are referred to as identical reference numerals, and the description is omitted and different structures are described.

As shown in FIG. 13, the motor 101 is provided with a cylindrical housing 111, a rotor 100a rotatably supported in the housing 111, a stator 112 surrounding the rotor 100a and a sensor 113 for detecting a rotational position of the rotor 100a.

In the following description, for descriptive purposes, an upper direction where the shaft 2 protrudes is defined as "another direction" and a lower direction is defined as "one direction" as viewed from the housing 111 of the motor 101 in the figures.

The housing 111 has a bearing 114a rotatably supporting one side of the rotor 100a, a bearing 114b rotatably supporting another side of the rotor 100a, a substrate 115 on which a sensor 113 is mounted, and a platform 119 holding the substrate 115. A bracket 117 sealing an opening 111a of the housing 111 is disposed on an upper end portion of the housing 111.

The rotor (a rotor for a motor) 100a is provided with the shaft 2, a core 106, a magnet (an example of a ring-shaped member, and is called a sensor magnet in the following) 107, and a magnet 108. The details of the rotor 100a will be described later.

The sensor 113 is disposed in a position on the substrate 115 facing the sensor magnet 107 of the rotor 100a in the rotational shaft direction of the shaft 2. The sensor 113 converts a magnetic field generated by the sensor magnet 107 into an electrical signal, which is output to an unillustrated control unit or the like. With the output of the electrical signal following a change in the magnetic field by the sensor 113, it is possible to detect a rotational position and a rotational speed of the rotor 100a through the control unit or the like.

Figure 14:
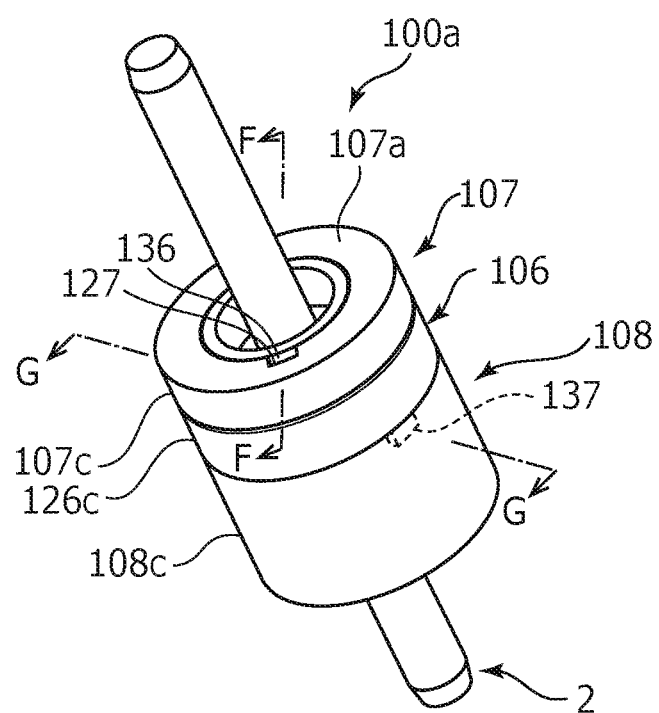
FIG. 14 A perspective view of a rotor.
Figure 15:
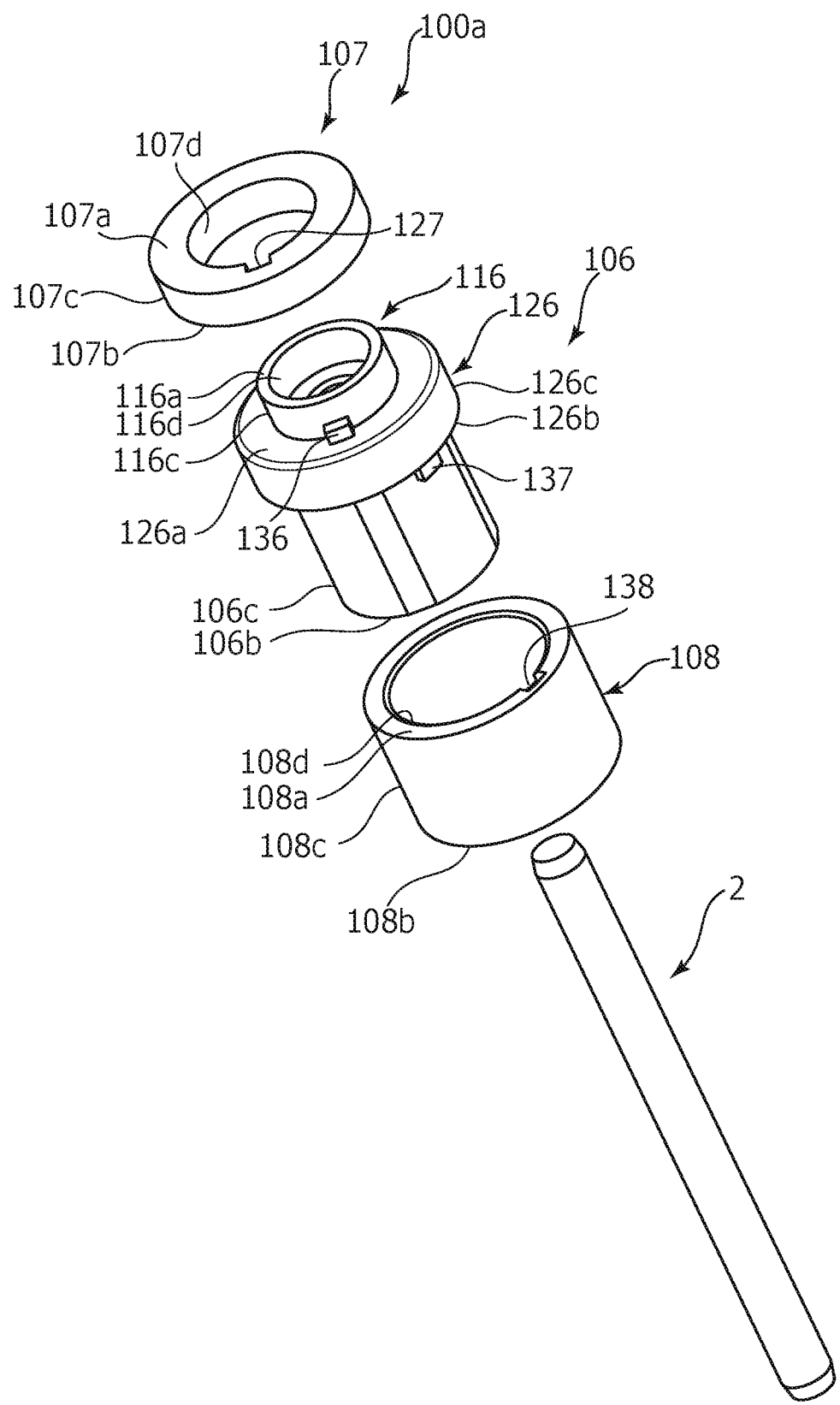
FIG. 15 An exploded perspective view of the rotor in FIG. 14.
Figure 16:
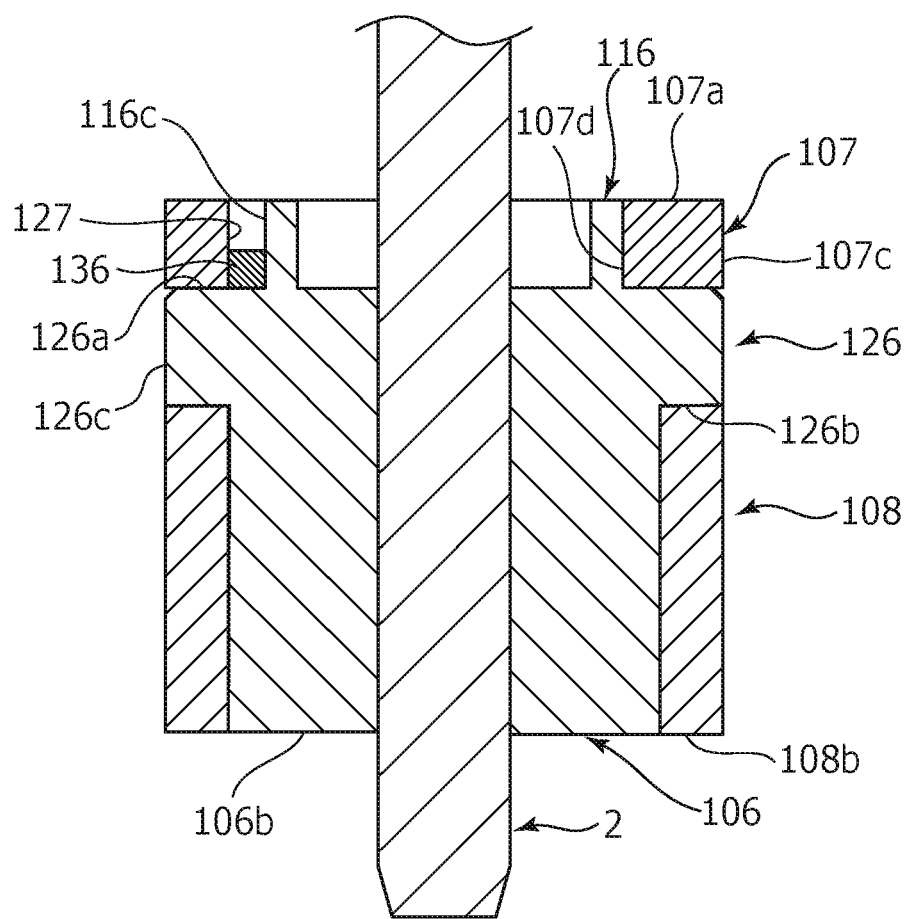
FIG. 16 A cross part taken along line F-F in FIG. 14.
Figure 17:
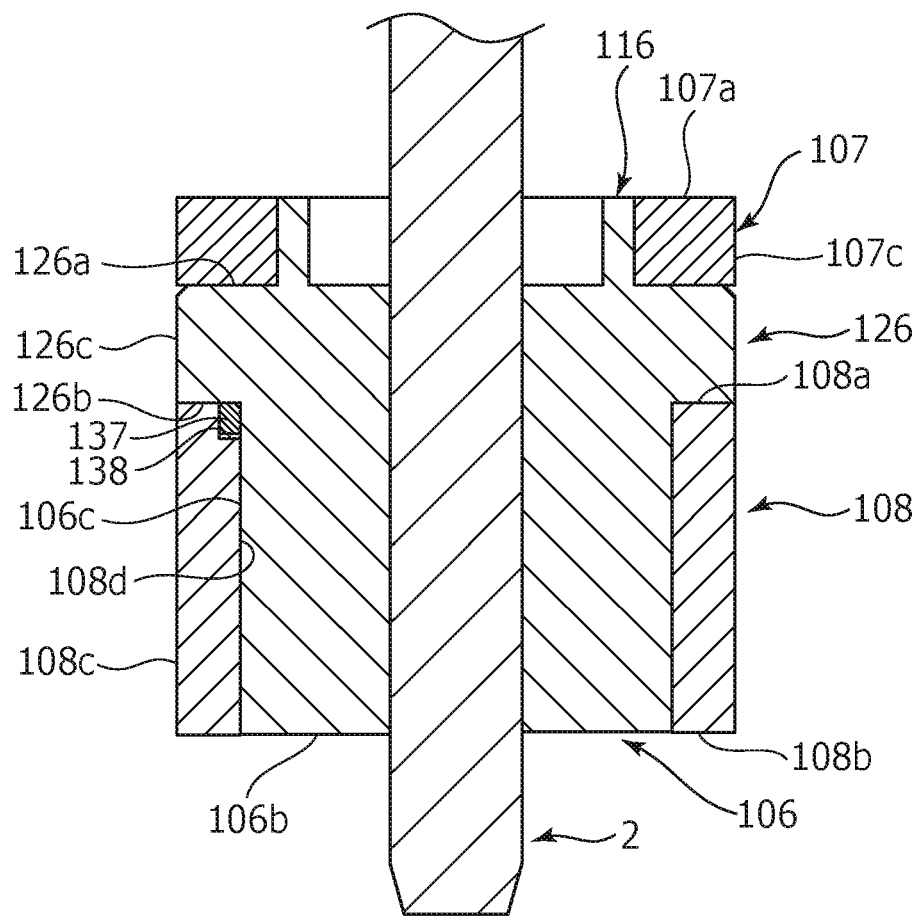
FIG. 17 A cross part taken along line G-G in FIG. 14.

FIG. 14 is a perspective view showing the rotor 100a which is one of members defining the motor 101. FIG. 15 is an exploded perspective view of the rotor 100a shown in FIG. 14. FIG. 16 is a cross part taken along line F-F in FIG. 14. FIG. 17 is a cross part taken along line G-G in FIG. 14.

As shown in FIG. 14 and FIG. 15, the rotor 100a is provided with the shaft 2 as a rotational shaft, the core 106 as a columnar member extending in the rotational shaft direction, the sensor magnet 107 formed in a ring shape and the magnet 108 as a cylindrical member.

As shown in FIG. 15, the core 106 has a lower surface 106b (one surface) as a surface on one side in the rotational shaft direction, and an outer peripheral surface 106c extending in the rotational shaft direction and facing the outside, and is annularly formed to surround the shaft 2. The core 106 has another-side protruding portion 116 protruding to the other side in the rotational shaft direction, and a flange portion 126 positioned between the sensor magnet 107 and the magnet 108. The flange portion 126 is disposed in a position close to the other-side protruding portion 116 over a central part of the core 106 in the rotational shaft direction.

The other-side protruding portion 116 has an upper surface 116a facing the other side, the outer peripheral surface 116c extending in the rotational shaft direction and facing the outside, and an inner peripheral surface 116d as a surface facing the inside and surrounding the shaft 2. An outer diameter of the other-side protruding portion 116 and an outer diameter of the core 106 each are set to be smaller than an outer diameter of the flange portion 126.

The flange portion 126 is defined by two surfaces (an upper surface 126a and a lower surface 126b) opposing in the rotational shaft direction, and an outer peripheral surface 126c facing the outside between the upper surface 126a and the lower surface 126b.

As shown in FIG. 15 and FIG. 16, a first engaging portion 136 is disposed on the upper surface 126a of the flange portion 126 to suppress rotation of the sensor magnet 107. A first engaged portion 127 to be engaged with the first engaging portion 136 is disposed in the sensor magnet 107. With the engagement between the first engaging portion 136 and the first engaged portion 127, the sensor magnet 107 is engaged with the other-side protruding portion 116 on the upper surface 126a of the flange portion 126. The first engaging portion 136 has a substantially cuboid shape or a substantially cubic shape protruding to the other side from the upper surface 126a of the flange portion 126, and two surfaces of the first engaging portion 136 are integrally provided in a state of being in contact with the outer peripheral surface 116c of the other-side protruding portion 116 and the upper surface 126a of the flange portion 126.

A length of the first engaging portion 136 protruding outside from the outer peripheral surface 116c of the other-side protruding portion 116 is set to be shorter than a length from the outer peripheral surface 116c of the other-side protruding portion 116 to the outer peripheral surface 126c of the flange portion 126. That is, a surface of the first engaging portion 136 facing the outside is positioned closer to the inside than the outer peripheral surface 126c of the flange portion 126.

As shown in FIG. 15 and FIG. 17, a second engaging portion 137 is disposed on the outer peripheral surface 106c of the core 106 to suppress rotation of the magnet 108. A second engaged portion 138 to be engaged with the second engaging portion 137 is disposed on an inner peripheral surface of the magnet 108. With the engagement between the second engaging portion 137 and the second engaged portion 137, the magnet 108 is engaged with the core 106 on the lower surface 126b of the flange portion 126. The second engaging portion 137 has a substantially cuboid shape or a substantially cubic shape protruding to the one side from the lower surface 126b of the flange portion 126, and two surfaces of the second engaging portion 137 are integrally provided in a state of being in contact with the lower surface 126b of the flange portion 126 and the outer peripheral surface 106c of the core 106.

A length of the second engaging portion 137 protruding outside from the outer peripheral surface 106c of the core 106 is set to be shorter than a length from the outer peripheral surface 106c of the core 106 to the outer peripheral surface 126c of the flange portion 126. That is, a surface of the second engaging portion 137 facing the outside is positioned closer to the inside than the outer peripheral surface 126c of the flange portion 126.

As shown in FIG. 14 and FIG. 15, the sensor magnet 107 has two surfaces (an upper surface 107a and a lower surface 107b) opposing in the rotational shaft direction, and an outer peripheral surface 107c facing the outside between the upper surface 107a and the lower surface 107b, and an inner peripheral surface 107d facing the inside, and is a ring-shaped member surrounding the other-side protruding portion 116. The sensor magnet 107 has the first engaged portion 127 to be engaged with the first engaging portion 136 of the flange portion 126.

An outer diameter (a size of an outer peripheral portion in the radial direction) of the sensor magnet 107 is set to be equal or substantially equal to an outer diameter of the flange portion 126. The upper surface 107a of the sensor magnet 107 is a permanent magnet magnetized such that magnet poles alternately differing like SNSN . . . along the circumferential direction are located, and the sensor magnet 107 changes in a magnet pole in a position facing the sensor 113 with rotation of the sensor magnet 107.

As shown in FIG. 15 and FIG. 16, the first engaged portion 127 of the sensor magnet 107 is a recessed portion recessed from the inner peripheral surface 107d toward the outer peripheral surface 107c of the sensor magnet 107, and is formed in a shape recessed from the upper surface 107a over the lower surface 107b of the sensor magnet 107. A circumferential length forming the recessed portion of the first engaged portion 127 is set to a value equal to a circumferential length of the first engaging portion 136. A depth of the most recessed part in the first engaged portion 127 from the inner peripheral surface 107d to the outer peripheral surface 107c is equal to or slightly larger than a length from the outer peripheral surface 116c of the other-side protruding portion 116 to a surface of the first engaging portion 136 facing the outside. That is, the first engaging portion 136 of the flange portion 126 is engageable with the first engaged portion 127 of the sensor magnet 107 by caulking. In place of the caulking, rotational caulking (called spin caulking as well) may be performed.

The first engaged portion 127 of the sensor magnet 107 is engageable with the first engaging portion 136 of the flange portion 126 by moving the sensor magnet 107 from the other side of the core 106 through the other-side protruding portion 116 to the one side. When the first engaged portion 127 of the sensor magnet 107 is engaged with the first engaging portion 136 of the flange portion 126, the sensor magnet 107 is fixed to the other-side protruding portion 116, making it possible to suppress the rotation of the sensor magnet 107. When the first engaging portion 136 of the flange portion 126 is engaged with the first engaged portion 127 of the sensor magnet 107, the inner peripheral surface 107d of the sensor magnet 107 faces the outer peripheral surface 116c of the other-side protruding portion 116, and the outer peripheral surface 107c of the sensor magnet 107 and the outer peripheral surface 126c of the flange portion 126 are in a flush state, and the upper surface 107a of the sensor magnet and the upper surface 116a of the other-side protruding portion 116 are in a flush state.

As shown in FIG. 14 and FIG. 15, the magnet 108 has two surfaces (an upper surface 108a and a lower surface 108b) opposing in the rotational shaft direction, and an outer peripheral surface 108c facing the outside between the upper surface 108a and the lower surface 108b, and an inner peripheral surface 108d facing the inside, and is formed in an annular shape surrounding the core 106. The magnet 108 has the second engaged portion 138 to be engaged with the second engaging portion 137 of the flange portion 126. An outer diameter (a size of an outer peripheral portion in the radial direction) of the magnet 108 is set to a value equal or substantially equal to an outer diameter of the flange portion 126.

As shown in FIG. 15 and FIG. 17, the second engaged portion 138 of the magnet 108 is a recessed portion recessed from the inner peripheral surface 108d toward the outer peripheral surface 108c of the magnet 108. A length of the second engaged portion 138 extending from the upper surface 108a to the lower surface 108b of the magnet 108 is set to be equal to or slightly larger than a length of the second engaging portion 137 protruding to the one side from the lower surface 126b of the flange portion 126. A circumferential length forming the recessed portion of the second engaged portion 138 is set to a value equal to a circumferential length of the second engaging portion 137. Further, a depth of the most recessed part in the second engaged portion 138 from the inner peripheral surface 108d to the outer peripheral surface 108c is set to be equal to or slightly larger than a length from the outer peripheral surface 106b of the core 106 to a surface of the second engaging portion 137 facing the outside. That is, the second engaging portion 137 of the flange portion 126 can be coupled to the second engaged portion 138 of the magnet 108 by adhesives or the like.

The second engaged portion 138 of the magnet 108 is engageable with the second engaging portion 137 by moving the magnet 108 from the one side to the other side of the core 106. When the second engaged portion 138 of the magnet 108 is engaged with the second engaging portion 137 of the flange portion 126, the magnet 108 is fixed to the core 106, suppressing the rotation of the magnet 108. When the second engaging portion 137 of the flange portion 126 is engaged with the second engaged portion 138 of the magnet 108, the inner peripheral surface 108d of the magnet 108 faces the outer peripheral surface 106c of the core 106, and the outer peripheral surface 108c of the magnet 108, the outer peripheral surface 126c of the flange portion 126 and the outer peripheral surface 107c of the sensor magnet 107 become flush.

In this way, the first engaging portion 136 of the flange portion 126 is coupled to the first engaged portion 127 of the sensor magnet 107 using an adhesive or the like, and the second engaging portion 137 of the flange portion 126 is coupled to the second engaged portion 138 of the magnet 108 using an adhesive or the like. Thereby the sensor magnet 107 is located and attached to the other side of the core 106, and the magnet 108 is located and attached to the one side of the core 106.

At this time, when the first engaging portion 136 of the flange portion 126 is engaged with the first engaged portion 127 of the sensor magnet 107, the rotation of the sensor magnet 107 to the core 106 is suppressed. That is, in a state where the sensor magnet 107 is suppressed from rotating in the circumferential direction to the core 106, the sensor magnet 107 is engaged with the other-side protruding portion 116. In addition, when the second engaging portion 137 of the flange portion 126 is engaged with the second engaged portion 138 of the magnet 108, the rotation of the magnet 108 to the core 106 is suppressed. That is, in a state where the magnet 108 is suppressed from rotating in the circumferential direction to the core 106, the magnet 108 is engaged with the core 106.

Further, since the first engaging portion 136 and the second engaging portion 137 are disposed to the flange portion 126, the sensor magnet 107 is suppressed from moving to one side in an axial direction by the upper surface 106a of the flange portion 126 and the magnet 108 is suppressed from moving to the other side in the axial direction by the lower surface 106b of the flange portion 126. That is, a displacement of each of the sensor magnet 107 and the magnet 108 in the rotational shaft direction is also suppressed by the flange portion 126.

As described above, when the sensor magnet 107 and the magnet 108 are attached in a state of being suppressed from rotating to the core 106, with a simple structure the sensor magnet 107 and the magnet 108 can be fixed to the core 106 in a state of being suppressed from rotating to the core 106.

Incidentally, when the sensor magnet 107 and the magnet 108 are fixed using the method by the adhesion only, a relative position of the sensor magnet 107 and the magnet 108 with respect to the core 106 is shifted due to adhesive aging, which makes it impossible for the sensor 113 to detect a rotational position and a rotational speed of the rotor 100a. That is, when the relative position of the sensor magnet 107 with respect to the core 106 is shifted, a phase difference to the rotor 100a is generated, thereby making it impossible to accurately detect the rotational position and the rotational speed of the rotor 100a.

When the relative position of the magnet 108 and the core 106 is shifted, the shift is a cause of insufficient rotation of the rotor 100a, which in some cases makes it difficult to maintain reliability of the rotor 100a. On the other hand, in the rotor 100a in the second embodiment, the first engaging portion 136 of the flange portion 126 is engaged with the first engaged portion 127 of the sensor magnet 107, and the second engaging portion 137 of the flange portion 126 is engaged with the second engaged portion 138 of the magnet 108. Thereby the sensor magnet 107 and the magnet 108 are fixed in a state where the relative position of the sensor magnet 107 and the magnet 108 to the core 106 in the circumferential direction is maintained. Therefore in the motor 101, the reliability of the rotor 100a can be improved and the rotational position and the rotational speed can be accurately detected by the sensor 13.

Variants

Figure 18A:
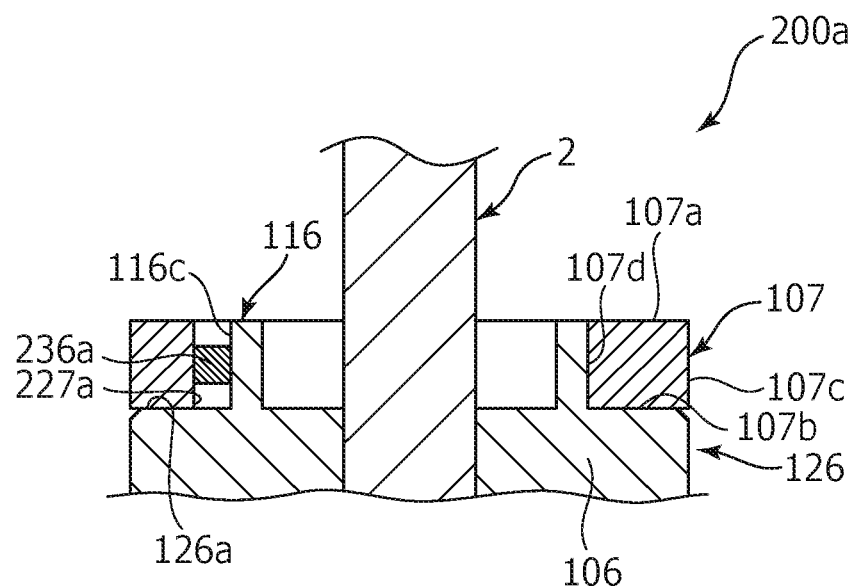
FIG. 18 An enlarged cross part showing a first variant and a second variant of a rotor according to the second embodiment of the present invention.
Figure 18B:
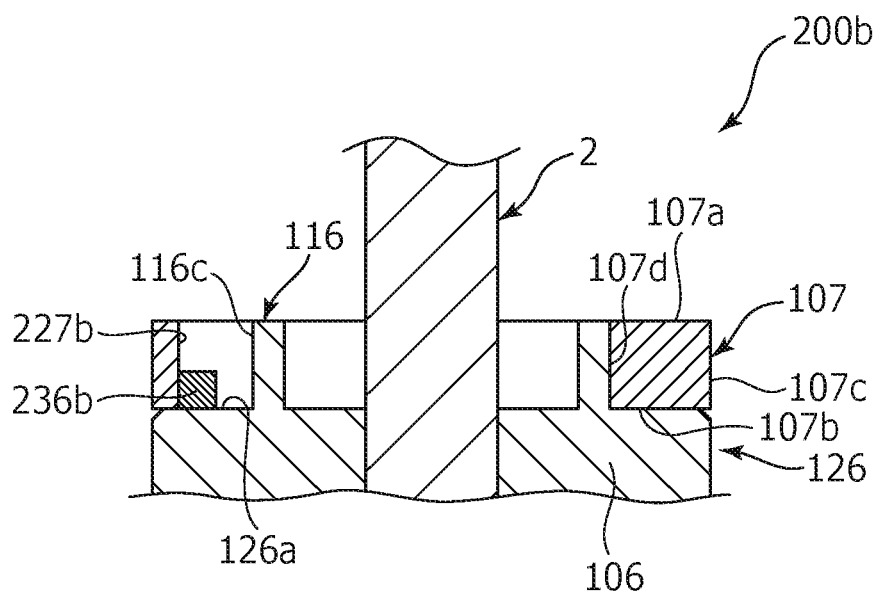
Figure 19A:
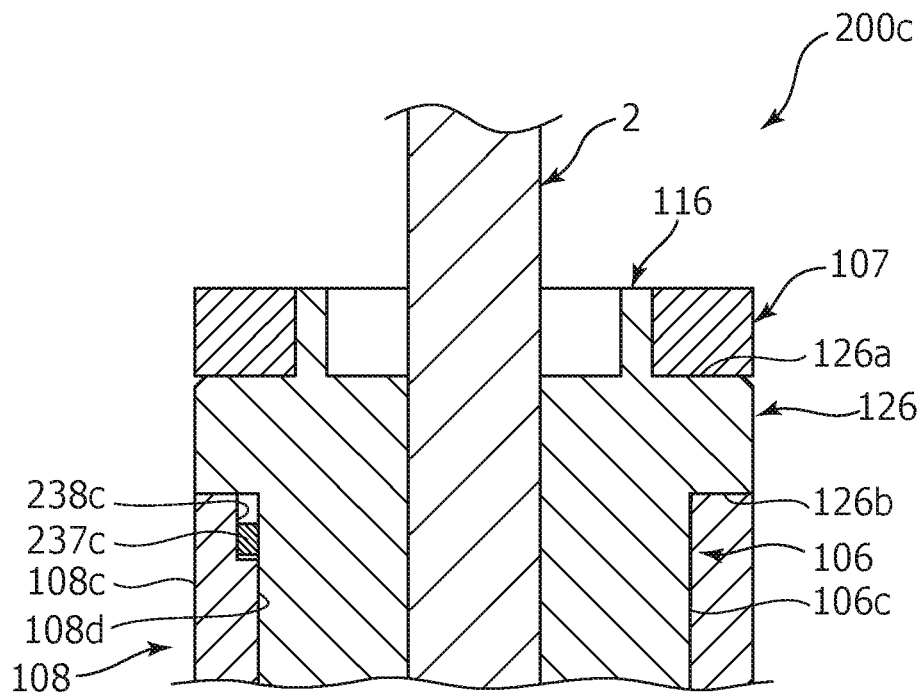
FIG. 19 An enlarged cross part showing a third variant and a fourth variant of a rotor according to the second embodiment of the present invention.
Figure 19B:
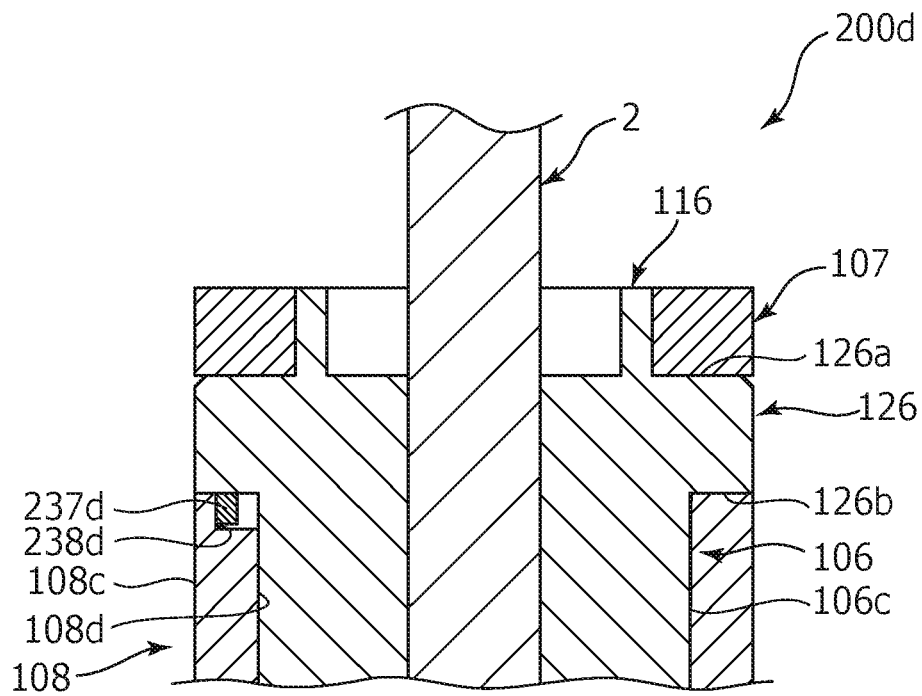

Next, a first variant to a fourth variant of the rotor 100a according to the second embodiment of the present invention as described above will be described with reference to FIG. 18 and FIG. 19. FIG. 18 and FIG. 19 are enlarged cross parts showing variants of the rotor 100a according to the second embodiment of the present invention. FIG. 18(a) is a first variant of the rotor shown in FIG. 15 and FIG. 18(b) is a second variant of the rotor 100a shown in FIG. 15. FIG. 19(a) is a third variant of the rotor 100a shown in FIG. 15, and FIG. 19(b) is a fourth variant of the rotor 100a shown in FIG. 15. In rotors according to the first variant and the second variant, shapes of a first engaging portion and a first engaged portion differ, and in the third variant and in the fourth variant, shapes of a second engaging portion and a second engaged portion differ.

As shown in FIG. 18(a), a rotor 200a according to the first variant has a first engaging portion 236a protruding outside from the outer peripheral surface 116c of the other-side protruding portion 116, and a first engaged portion 227a to be engaged with the first engaging portion 236a.

The first engaging portion 236a has a substantially cuboid shape or a substantially cubic shape, and a surface of the first engaging portion 236a facing the one side is disposed in a position away from the upper surface 126a of the flange portion 126 toward the other side. That is, the first engaging portion 236a is disposed in a state where only one surface of the first engaging portion 236a contacts the outer peripheral surface 116c of the other-side protruding portion 116.

The first engaged portion 227a is a recessed portion recessed from the inner peripheral surface 107d toward the outer peripheral surface 107c of the sensor magnet 107, and is formed from the upper surface 107a over the lower surface 107b of the sensor magnet 107. A circumferential length forming the recessed portion of the first engaged portion 227a is set to a value equal to a circumferential length of the first engaging portion 236a. A depth of the most recessed part in the first engaged portion 227a from the inner peripheral surface 107d to the outer peripheral surface 107c is set to be equal to or slightly larger than a length of the first engaging portion 236a protruding in the outside direction from the outer peripheral surface 116c of the other-side protruding portion 116. That is, the first engaging portion 236a of the other-side protruding portion 116 is engageable with the first engaged portion 227a of the sensor magnet 107 by caulking or rotational caulking (spin caulking).

As shown in FIG. 18(b), a rotor 200b according to the second variant has a first engaging portion 236b protruding to the other side from the upper surface 106a of the flange portion 126, and a first engaged portion 227b to be engaged with the first engaging portion 236b.

The first engaging portion 236b has a substantially cuboid shape or a substantially cubic shape, and a surface of the first engaging portion 236a facing the inside is disposed away from the outer peripheral surface 116c of the other-side protruding portion 116. That is, the first engaging portion 236b is disposed in a state where only one surface of the first engaging portion 236b contacts the upper surface 126a of the flange portion 126.

The first engaged portion 227b is a recessed portion recessed from the inner peripheral surface 107d toward the outer peripheral surface 107c of the sensor magnet 107, and is formed from the upper surface 107a over the lower surface 107b of the sensor magnet 107. A circumferential length of the first engaged portion 227b is set to a value equal to a circumferential length of the first engaging portion 236b. A depth of the most recessed part in the first engaged portion 227b from the inner peripheral surface 107d to the outer peripheral surface 107c is set to be equal to or slightly larger than a length from the outer peripheral surface 116c of the other-side protruding portion 116 to a surface of the first engaging portion 236b facing the outside. That is, the first engaging portion 236b of the flange portion 126 is engageable with the first engaged portion 227b of the sensor magnet 107 by caulking or rotational caulking (spin caulking).

As shown in FIG. 19(a), a rotor 200c according to the third variant has a second engaging portion 237c protruding to the outside from the outer peripheral surface 106c of the core 106, and a second engaged portion 238c to be engaged with the second engaging portion 237c.

The second engaging portion 237c has a substantially cuboid shape or a substantially cubic shape, and a surface of the second engaging portion 237c facing the other side is disposed in a position away from the lower surface 126b of the flange portion 126 toward the one side. That is, the second engaging portion 237c is disposed in a state where only one surface of the second engaging portion 237c contacts the outer peripheral surface 106c of the core 106.

The second engaged portion 238c is a recessed portion recessed from the inner peripheral surface 108d toward the outer peripheral surface 108c of the magnet 108. A length of the second engaged portion 238c extending from the upper surface 108a toward the lower surface 108b of the magnet 108 is set to be equal to or slightly larger than a length from the lower surface 126b of the flange portion 126 to a surface of the second engaging portion 237c facing the one side. A circumferential length forming the recessed portion of the second engaged portion 238c is set to a value equal to a circumferential length of the second engaging portion 237c. A depth of the most recessed part in the second engaged portion 238c from the inner peripheral surface 107d to the outer peripheral surface 107c is set to be equal to or slightly larger than a length from the outer peripheral surface 106c of the core 106 to a surface of the second engaging portion 237c facing the outside. That is, the second engaging portion 237c of the core 106 is engageable with the second engaged portion 238c of the magnet 108 by caulking or rotational caulking (spin caulking).

As shown in FIG. 19(b), a rotor 200d according to the fourth variant has a second engaging portion 237d protruding to the one side from the lower surface 126b of the flange portion 126, and a second engaged portion 238d to be engaged with the second engaging portion 237d.

The second engaging portion 237d has a substantially cuboid shape or a substantially cubic shape, and a surface of the second engaging portion 237d facing the inside is disposed away from the outer peripheral surface 106c of the core 106. That is, the second engaging portion 237d is disposed in a state where only one surface of the second engaging portion 237d contacts the lower surface 126b of the flange portion 126.

The second engaged portion 238d is a recessed portion recessed from the inner peripheral surface 108d toward the outer peripheral surface 108c of the magnet 108. A length of the second engaged portion 238d extending from the upper surface 108a toward the lower surface 108b of the magnet 108 is set to be equal to or slightly larger than a length from the lower surface 126b of the flange portion 126 to a surface of the second engaging portion 237d facing the one side.

A circumferential length forming the recessed portion of the second engaged portion 238d is set to a value equal to a circumferential length of the second engaging portion 237d. A depth of the most recessed part in the second engaged portion 238d from the inner peripheral surface 108d to the outer peripheral surface 108c is set to be equal to or slightly larger than a length from the outer peripheral surface 106c of the core 106 to a surface of the second engaging portion 237d facing the outside. That is, the second engaging portion 237d of the core 106 is engageable with the second engaged portion 238d of the magnet 108 by caulking or rotational caulking (spin caulking).

In this way, since the first engaging portion 237a is engaged with the first engaged portion 227a or the first engaging portion 237b is engaged with the first engaged portion 227b, the sensor magnet 107 can be fixed in a state of being suppressed from rotating to the core 106.

Since the second engaging portion 237c is engaged with the second engaged portion 238c or the second engaging portion 237d is engaged with the second engaged portion 238d, the magnet 108 can be fixed in a state of being suppressed from rotating to the core 106.

Others

In the second embodiment as described above, there is explained a case where the first engaging portion is disposed on the upper surface 126a of the flange portion 126, and the first engaged portion is disposed in the sensor magnet 107, but the first engaging portion may be disposed in the sensor magnet 107, and the first engaged portion may be disposed on the upper surface 106a of the flange portion 126. That is, by the first engaging portion in a substantially cuboid shape or a substantially cubic shape protruding to the one side from the lower surface 107b of the sensor magnet 107 and the first engaged portion as the recessed portion recessed toward the lower surface 126b from the upper surface 126a of the flange portion 126, the other-side protruding portion 116 may be formed to be engaged with the sensor magnet 107. In addition, by the first engaging portion in a substantially cuboid shape or a substantially cubic shape protruding to the inside from the inner peripheral surface 107d of the sensor magnet 107 and the first engaged portion as the recessed portion recessed toward the inside from the outer peripheral surface 116c of the other-side protruding portion 116, the other-side protruding portion 116 may be formed to be engaged with the sensor magnet 107.

In the second embodiment as described above, there is explained a case where the second engaging portion is disposed on the lower surface 126b of the flange portion 126, and the second engaged portion is disposed in the magnet 108, but the second engaging portion may be disposed in the magnet 108, and the second engaged portion may be disposed on the lower surface 126b of the flange portion 126. That is, by the second engaging portion in a substantially cuboid shape or a substantially cubic shape protruding to the other side from the upper surface 108a of the magnet 108 and the second engaged portion as the recessed portion recessed toward the other side from the lower surface 126b of the flange portion 126, the core 106 may be formed to be engaged with the magnet 108. In addition, by the first engaging portion in a substantially cuboid shape or a substantially cubic shape protruding to the inside from the inner peripheral surface 108d of the magnet 108 and the first engaged portion as the recessed portion recessed toward the inside from the outer peripheral surface 106c of the core 106, the core 106 may be formed to be engaged with the magnet 108.

The embodiments are described as examples in all respects, and should be considered in a non-limiting manner. The scope of the present invention is not defined on a basis of the aforementioned explanation, but is defined by the claims and is intended to include meanings equivalent to the claims and all modifications within the claims.

LIST OF REFERENCE SIGNS 1 motor
1a rotor
2 shaft (an example of a rotational shaft)
3 magnet
3c, 3d fitted portion
6 core (an example of a magnetic body)
6a flange portion
6b lower surface of core
6c fitting portion
6e protruding portion
6f tubular portion
6g recess
6h head portion
9 ring (an example of a metallic member)
9a annular portion
9d fitting portion
11 housing
12 bracket
100a rotor
101 motor
106 core
107 sensor magnet
108 magnet
111 housing
112 stator
113 sensor
115 substrate
116 another-side protruding portion
126 flange portion
127 first engaged portion
136 first engaging portion
137 second engaging portion 138 second engaged portion
200a, 220b, 200c, 200d rotor
227a, 227b first engaged portion
236a, 236b first engaging portion
237c, 237d second engaging portion
238c, 238d second engaged portion

The invention claimed is:

1. A rotor for a motor comprising:
a rotational shaft;
an annular magnetic body having two surfaces opposing in a rotational shaft direction and a protruding portion protruding in the rotational shaft direction from one surface of the two surfaces and an outer peripheral surface;
a metallic member surrounding the protruding portion; and
an annular magnet surrounding the magnetic body, wherein
the protruding portion surrounds the rotational shaft,
the magnet is provided with two surfaces opposing in the rotational shaft direction,
the metallic member is disposed at one surface of the magnet, and
the metallic member is interposed between the protruding portion and one surface of the magnetic body,
a curved portion and a planar portion are arranged at the outer peripheral surface of the annular magnetic body, and
an adhesive is arranged at a space formed between the planar portion and an inner peripheral surface of the magnet.

2. The rotor for a motor according to claim 1, wherein
the two surfaces of the magnetic body correspond respectively to an upper surface and a lower surface,
the two surfaces of the magnet correspond respectively to an upper surface and a lower surface, and
a position of the magnet with respect to the magnetic body is restricted by the metallic member in the rotational shaft direction.

3. The rotor for a motor according to claim 1, wherein a planar shape of the metallic member has an annular shape.

4. The rotor for a motor according to claim 1, wherein
a planar shape of the protruding portion is formed in an annular shape, and
the protruding portion includes a head portion and a tubular portion between the head portion and the one surface.

5. The rotor for a motor according to claim 4, wherein a planar shape of the head portion is formed in an annular shape.

6. The rotor for a motor according to claim 1, wherein
the protruding portion has a recess recessed toward the rotational shaft between the head portion and the one surface, and
a part of the metallic member is accommodated in the recess.

7. The rotor for a motor according to claim 1, wherein
the magnet has a fitted portion, and
at least one of the metallic member and the magnetic body has a fitting portion to be fitted in the fitted portion.

8. The rotor for a motor according to claim 7, wherein the fitting portion is a protruding portion radially protruding toward an inner peripheral surface of the magnet.

9. The rotor for a motor according to claim 7, wherein the fitted portion is a recessed portion radially recessed toward an outer peripheral surface from the inner peripheral surface of the magnet.

10. The rotor for a motor according to claim 7, wherein
another surface of the magnetic body is provided with an annular flange portion radially extending toward the outside, and
the flange portion supports another surface of the magnet.

11. The rotor for a motor according to claim 10, wherein
a surface of the flange portion facing the other surface of the magnet is provided with the fitting portion, and
the other surface of the magnet facing the flange portion is provided with a fitted portion.

12. A motor comprising:
a housing;
the rotor for a motor according to claim 1; and
a stator surrounding the rotor for a motor.

* * * * *